United States Patent
Li et al.

(10) Patent No.: US 12,056,049 B2
(45) Date of Patent: Aug. 6, 2024

(54) OUT-OF-ORDER BUFFER AND ASSOCIATED MANAGEMENT METHOD

(71) Applicant: RDC Semiconductor Co., Ltd., Hsinchu (TW)

(72) Inventors: Jyun-Yan Li, Hsinchu (TW); Po-Hsiang Huang, Hsinchu (TW); Ya-Ting Chen, Hsinchu (TW); Yao-An Tsai, Hsinchu (TW); Shu-Wei Yi, Hsinchu (TW)

(73) Assignee: RDC SEMICONDUCTOR CO., LTD., Hsinchu (TW)

( * ) Notice: Subject to any disclaimer, the term of this patent is extended or adjusted under 35 U.S.C. 154(b) by 42 days.

(21) Appl. No.: 17/989,729

(22) Filed: Nov. 18, 2022

(65) Prior Publication Data
US 2024/0126694 A1    Apr. 18, 2024

(30) Foreign Application Priority Data
Oct. 13, 2022    (TW) .................................. 111138835

(51) Int. Cl.
*G06F 13/16*    (2006.01)
*G06F 12/0802*    (2016.01)

(52) U.S. Cl.
CPC ...... *G06F 12/0802* (2013.01); *G06F 13/1642* (2013.01); *G06F 2212/60* (2013.01)

(58) Field of Classification Search
CPC ............. G06F 12/0802; G06F 13/1642; G06F 2212/60
USPC ........................................................ 710/39
See application file for complete search history.

(56) References Cited

U.S. PATENT DOCUMENTS

| | | | |
|---|---|---|---|
| 7,844,758 B1 | 11/2010 | Hughes | |
| 9,146,677 B2 | 9/2015 | Svendsen | |
| 10,228,951 B1 * | 3/2019 | Kothari | ................ G06F 9/3867 |
| 10,963,402 B1 * | 3/2021 | Donley | .............. G06F 13/1642 |
| 2003/0188107 A1 * | 10/2003 | Hill | ..................... G06F 12/0862 |
| | | | 712/E9.047 |
| 2008/0320016 A1 * | 12/2008 | Singh | .................... H04L 49/901 |
| 2011/0185159 A1 * | 7/2011 | Bishop | ................. G06F 9/3856 |
| | | | 712/E9.033 |
| 2019/0391815 A1 * | 12/2019 | McGlone | ............. G06F 9/3851 |

OTHER PUBLICATIONS

Office Action issued by TIPO on May 9, 2023.

* cited by examiner

*Primary Examiner* — Christopher B Shin
(74) *Attorney, Agent, or Firm* — WPAT, P.C.

(57) ABSTRACT

An out-of-order buffer includes an out-of-order queue and a controlling circuit. The out-of-order queue includes a request sequence table and a request storage device. The controlling circuit receives and temporarily stores the plural requests into the out-of-order queue. After the plural requests are transmitted to plural corresponding target devices, the controlling circuit retires the plural requests. The request sequence table contains m×n indicating units. The request sequence table contains m entry indicating rows. Each of the m entry indicating rows contains n indicating units. The request storage device includes m storage units corresponding to the m entry indicating rows in the request sequence table. The state of indicating whether one request is stored in the corresponding storage unit of the m storage units is recoded in the request sequence table. The storage sequence of the plural requests is recoded in the request sequence table.

8 Claims, 12 Drawing Sheets

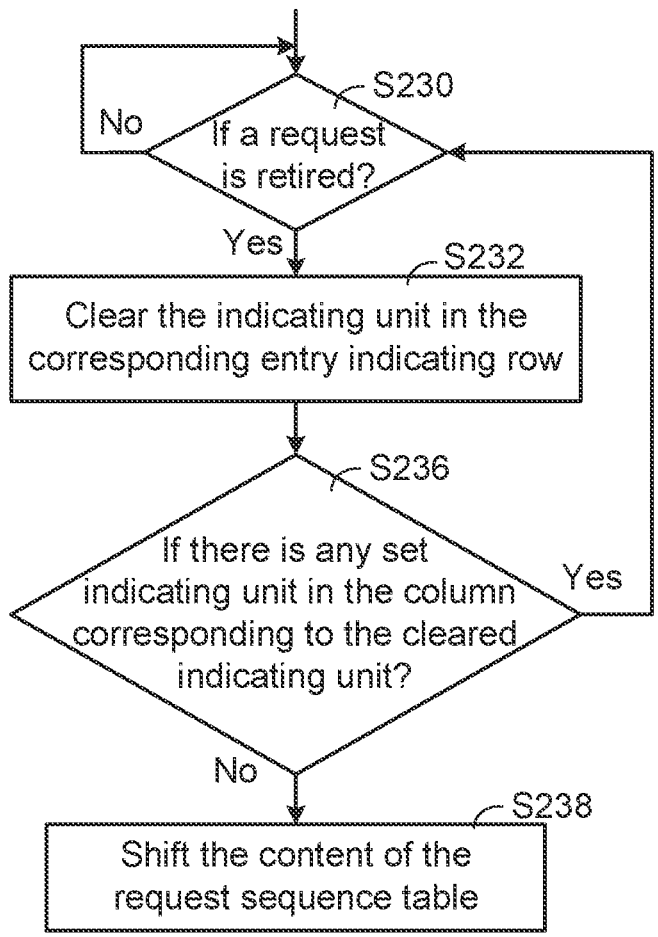
FIG. 3B
FIG. 4A
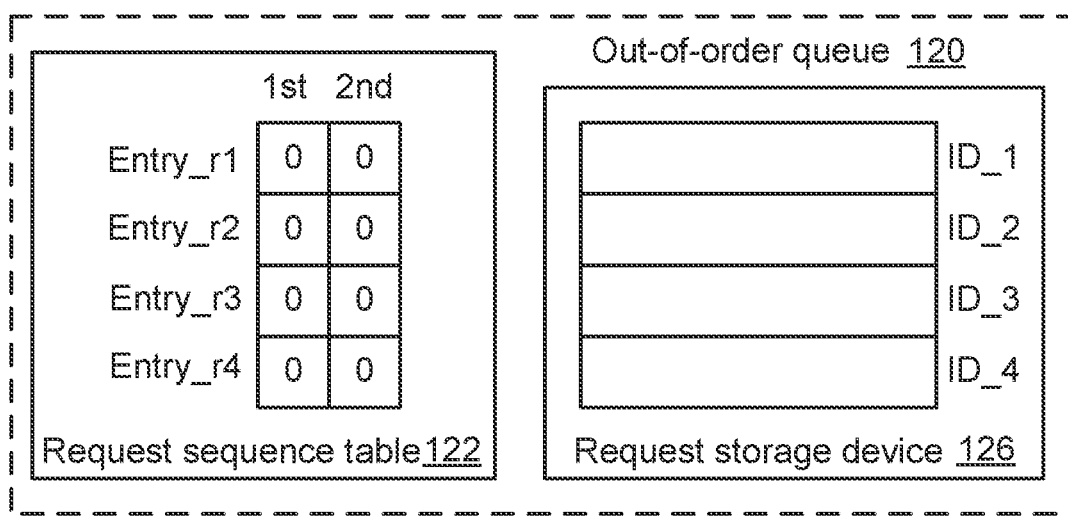
FIG. 4B

OUT-OF-ORDER BUFFER AND ASSOCIATED MANAGEMENT METHOD

This application claims the benefit of Taiwan Patent Application No. 111138835, filed Oct. 13, 2022, the subject matter of which is incorporated herein by reference.

FIELD OF THE INVENTION

The present invention relates to an out-of-order buffer, and more particularly to an out-of-order buffer with a request sequence table and an associated management method.

BACKGROUND OF THE INVENTION

As known, a buffer in the computer system comprises a queue. The queue can receive and temporarily store requests from requestors. In addition, the requests can be sent from the queue to the corresponding target devices. Generally, the requestors include the central processing unit (CPU) or the I/O devices in the computer system, and the target devices include the memory, the CPU or the I/O devices. Moreover, these requests include memory read requests, memory write requests, I/O read requests, I/O write requests, code fetch requests, and so on.

For example, the memory read requests and the memory write requests are transmitted to the memory, and the I/O read requests and the I/O write requests are transmitted to the I/O devices.

Since the requests from many requestors are temporarily stored in the buffer, the method of managing the buffer is very important. The use of a first-in-first-out queue (also referred as a FIFO queue) is one of the easiest management methods. The FIFO queue transmits requests according to the sequence of receiving the requests. In other words, the request received first will be sent to the target device first, and the request received later is sent to the target device later.

In the buffer, a controlling circuit can receive the storage sequence of the requests that are temporarily stored in the queue according to the arrangement order of the requests in the FIFO queue. For example, the request arranged at the front end of the queue and having been temporarily stored in the queue for the longest time is the first request to be transmitted to the target device. Moreover, the request arranged at the rear end of the queue and having been temporarily stored in the queue for the shortest time is the last request to be transmitted to the target device.

In case that the queue is a circular FIFO queue, the controlling circuit provides two pointers to point the oldest request and the newest request in the circular FIFO queue. According to the order relationship between the oldest request and the newest request, the controlling circuit realizes the storage sequence of all requests that are temporarily stored in the queue.

However, the above management methods cannot be applied in an out-of-order buffer. The out-of-order buffer comprises an out-of-order queue. In the out-of-order queue, the sequence of transmitting requests is not related to the sequence of receiving requests. Therefore, it is necessary to provide an effective method for the controlling circuit of the out-of-order to record the sequence of the plural requests that are temporarily stored in the queue.

SUMMARY OF THE INVENTION

An embodiment of the present invention provides an out-of-order buffer. The out-of-order buffer includes an out-of-order queue and a controlling circuit. The out-of-order queue includes a request sequence table and a request storage device. The controlling circuit is connected with the out-of-order queue. After the controlling circuit receives plural requests, the controlling circuit temporarily stores the plural requests into the out-of-order queue. After the plural requests are transmitted to plural corresponding target devices, the controlling circuit retires the plural request. The request sequence table contains m×n indicating units. The request sequence table contains m entry indicating rows. Each of the m entry indicating rows contains n indicating units. The request storage device includes m storage units corresponding to the m entry indicating rows in the request sequence table. A state of indicating whether one request is stored in the corresponding storage unit of the m storage units is recoded in the request sequence table, and a storage sequence of the plural requests is recoded in the request sequence table. Moreover, m and n are positive integers, and n is smaller than or equal to m. A first entry indicating row of the m entry indicating rows and a first storage unit of the m storage units correspond to a first number. If all of the n indicating units in the first entry indicating row are not set, the first storage unit is a freed entry, and no request is temporarily stored in the first storage unit. If one of the n indicating units in the first entry indicating row is set and the other (n−1) of the indicating units in the first entry indicating row are not set, the first storage unit is a used entry, and the first storage unit temporarily stores a first request.

Another embodiment of the present invention provides a management method for an out-of-order buffer, the out-of-order buffer comprising an out-of-order queue and a controlling circuit, the out-of-order queue comprising a request sequence table and a request storage device, the controlling circuit comprising an allocate controller, a deallocate controller and a dispatch controller, the request sequence table containing m×n indicating units, the request sequence table containing m entry indicating rows, each of the m entry indicating rows containing n indicating units, the management method comprising steps of: (a) receiving a request; (b) judging whether there is any free entry according to a content of the request sequence table; (c) if there is no free entry, blocking the request, and performing the step (b) again; (d) if there is the free block, judging whether a used column of the allocate controller is a last column of the request sequence table; (e) if the used column is the last column of the request sequence table and entry numbers of all free entries are smaller than an entry number of a newest used entry, blocking the request, and performing the step (b) again; (f) if the used column is the last column of the request sequence table and the entry number of at least one free entry is not smaller than an entry number of the newest used entry, selecting the free entry with an entry number larger than the entry number of the newest used entry to temporarily store the request, and setting the indicating unit in the used column and corresponding to the free entry; (g) if the used column is not the last column of the request sequence table and the entry number of at least one free entry is not smaller than an entry number of the newest used entry, selecting the free entry with an entry number larger than the entry number of the newest used entry to temporarily store the request, and setting the indicating unit in the used column and corresponding to the free entry; and (h) if the used column is not the last column of the request sequence table and the entry numbers of all free entries are smaller than the entry number of the newest used entry, using a next column of the request sequence table as the used column, selecting the free entry with a smallest entry number to temporarily store the request, and setting the indicating unit in the new used column and corresponding to the free entry.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 3B is a flowchart illustrating a method for managing the request sequence table by the deallocate controller of the out-of-order buffer according to the embodiment of the present invention;

DETAILED DESCRIPTION OF PREFERRED EMBODIMENTS

Figure 1:
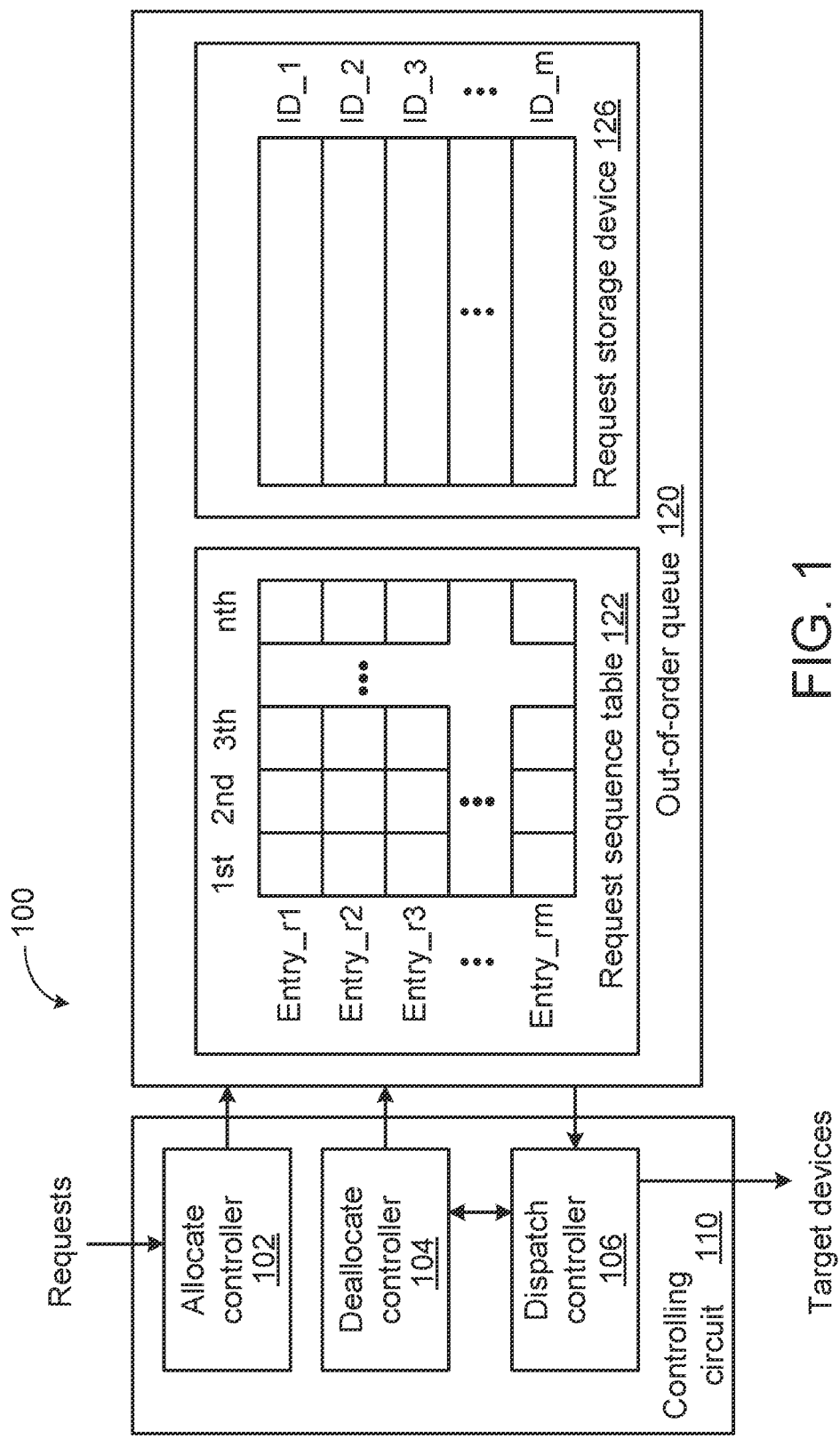
FIG. 1 schematically illustrates the architecture of an out-of-order buffer according to an embodiment of the present invention.

FIG. 1 schematically illustrates the architecture of an out-of-order buffer according to an embodiment of the present invention. The out-of-order buffer 100 comprises a controlling circuit 110 and an out-of-order queue 120. The controlling circuit 110 is connected with the out-of-order queue 120. The controlling circuit 110 comprises an allocate controller 102, a deallocate controller 104 and a dispatch controller 106. The out-of-order queue 120 comprises a request sequence table 122 and a request storage device 126. The request sequence table 122 and the request storage device 126 are implemented with a static random access memory (SRAM) or a dynamic random access memory (DRAM). Moreover, in the request sequence table 122, m and n are positive integers, and n is smaller than or equal to m. The operating principles of the components in the out-of-order buffer 100 will be described as follows.

The request storage device 126 of the out-of-order queue 120 comprises m storage units ID_1~ID_m. Each of the m storage units ID_1~ID_m can temporarily store one request. For example, in case that the request is a memory read request, the request content stored in the storage unit at least contains an access type and a memory address. In case that the request is a memory write request, the request content stored in the storage unit at least contains an access type, a memory address and a write data.

In case that one of the storage units ID_1~ID_m is a free entry, it means that no request is stored in the storage unit. Whereas, in case that one of the storage units ID_1~ID_m is a used entry, it means that a valid request has been stored in the storage unit. For example, if the storage unit ID_1 is a free entry, the storage unit ID_1 does not store any request, or the storage unit ID_1 stores an invalid request. Under this circumstance, the storage unit ID_1 can be used to store a request. If the storage unit ID_1 is a used entry, it means that a valid request has been stored in the storage unit ID_1. The indexes ID_1~ID_m of the m storage units in the request storage device 126 can be used as entry numbers.

The request sequence table 122 contains m×n indicating units. For example, each indicating unit is a one-bit memory cell. Each indicating unit can be set as a logic value "1" or cleared as a logic value "0". In an embodiment, the content of the request sequence table 122 can indicate that the storage units ID_1~ID_m are free entries or used entries. Moreover, the request sequence table 122 can record the sequence of storing request in the used entries of the storage units ID_1~ID_m. The associated operations of the request sequence table 122 will be described as follows.

The request sequence table 122 contains m entry indicating rows Entry_r1~Entry_rm. The m entry indicating rows Entry_r1~Entry_rm are related to the m storage units ID_1~ID_m of the request storage device 126. The contents of the m entry indicating rows Entry_r1~Entry_rm indicate that the corresponding storage units ID_1~ID_m are free entries or used entries. Moreover, each of the entry indicating rows Entry_r1~Entry_rm in the request sequence table 122 contains n indicating units.

In case that all of the n indicating units in an entry indicating row are not set (e.g., the logic values of the n indicating units are all "0"), the corresponding storage unit is a free entry, which can be used to store a request. Whereas, in case that one of the n indicating units in an entry indicating row is set (e.g., the logic value of one of the n indicating units is set as "1"), the corresponding storage unit is a used entry where one request has been stored. Consequently, according to the content of the request sequence table 122, the storage units ID_0~ID_m can be judged as the free entries or the used entries.

For example, if none of the indicting units in the first entry indicating row Entry_1 (i.e., the entry indicating row with the indicating row number 1) of the request sequence table 122 is set, i.e., the logic values of the n indicating units are all "0", the corresponding storage unit ID_1 is a free entry. That is, the entry with the entry number 1 is a free entry capable of storing a request. Whereas, if one of the indicting units in the first entry indicating row Entry_1 (i.e., the entry indicating row with the indicating row number 1) is set, i.e., the logic value of one of the n indicating units is set as "1" and the logic values of the other (n−1) indicating units are all "0", the corresponding storage unit ID_1 is a used entry. That is, the entry with the entry number 1 is a used entry where one request has been stored.

In the request sequence table 122, at most one of the n indicating units in each entry indicating row can be set. In other words, two or more indicating units cannot be set at the same time. In each entry indicating row of the request sequence table 122, two situations are possible. In one possible situation, the logic values of the n indicating units in each entry indicating row of the request sequence table 122 are all "0". In the other possible situation, the logic value of one indicating unit in each entry indicating row of the request sequence table 122 is set as "1", but the logic values of the other (n−1) indicating units are all "0". In each entry indicating row of the request sequence table 122, two or more indicating units with the logic value "1" are not allowable.

Moreover, the sequency of storing requests into the storage units ID_0~ID_m can be realized according to the position of the set indicating unit in each of the m entry indicating rows Entry_1~Entry_m. For example, if the positions of plural set indicating units are in the same column of the request sequence table 122, the entry indicating row with a smaller indicating row number represents that the corresponding request has been temporarily stored in the request storage device 126 for a longer time. In contrast, the entry indicating row with a larger indicating number represents that the corresponding request has been temporarily stored in the request storage device 126 for a shorter time.

Moreover, if the positions of plural set indicating units lie in different columns of the request sequence table 122, the set indicating unit with a smaller indicating row number represents that the corresponding request has been temporarily stored in the request storage device 126 for a longer time. Whereas, the set indicating unit with a larger indicating row number represents that the corresponding request has been temporarily stored in the request storage device 126 for a shorter time.

Figure 2:
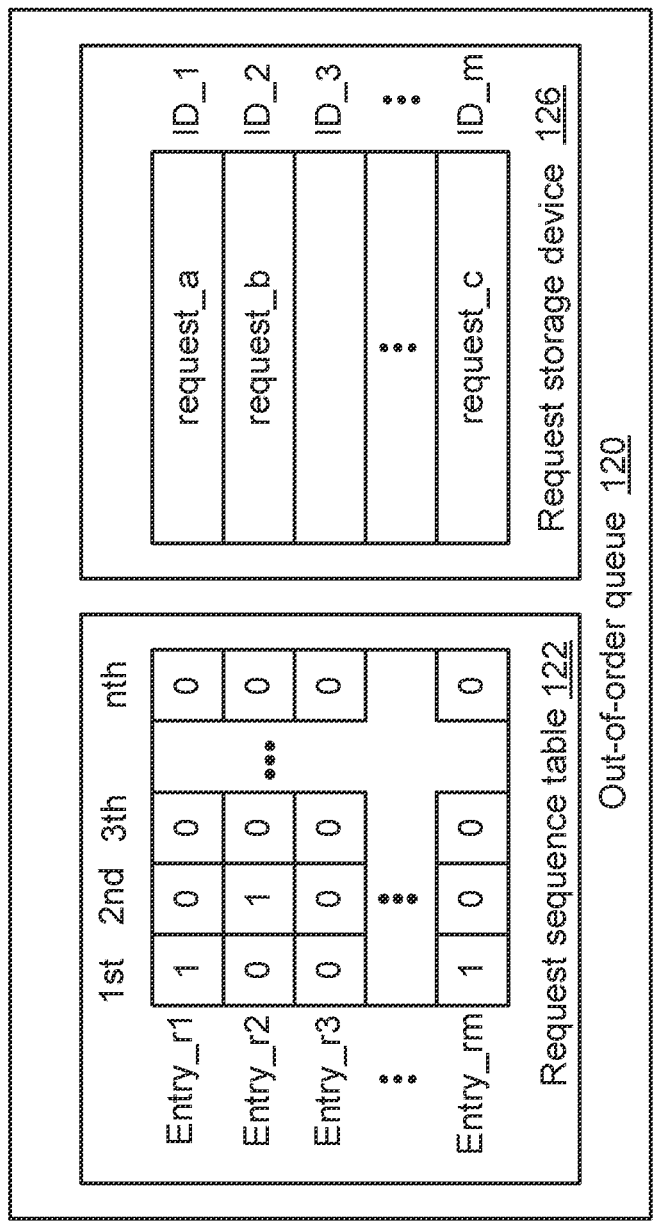
FIG. 2 schematically illustrates the architecture of an out-of-order queue in the out-of-order buffer according to the embodiment of the present invention.

FIG. 2 schematically illustrates the architecture of an out-of-order queue in the out-of-order buffer according to the embodiment of the present invention. The out-of-order queue 120 is related to the storage sequence relationships between the contents of the request sequence table 122 and the requests in the request storage device 126. In the first entry indicating row Entry_r1 (i.e., the entry indicating row with the indicating row number 1), the logic value of the first indicating unit in the first column is set as "1". In the m-th entry indicating row Entry_rm (i.e., the entry indicating row with the indicating row number m), the logic value of the indicating unit in the first column is set as "1". In the second entry indicating row Entry_r2 (i.e., the entry indicating row with the indicating row number 2), the logic value of the second indicating unit in the second column is set as "1". All of the indicating units in the other entry indicating rows are not set, or their logic values are cleared as "0". Consequently, the storage units ID_1, ID_2 and ID_m corresponding to the first entry indicating row Entry_r1, the second entry indicating row Entry_r2 and the m-th entry indicating row Entry_rm are determined as used entries. That is, the entries corresponding to the entry numbers 1, 2 and m are used entries. The entries corresponding to the other entry numbers are free entries, and no requests are temporarily stored in the corresponding storage units. For example, the three storage units ID_1, ID_2 and ID_m temporarily store the requests request_a, request_b and request_c, respectively.

According to the position of the set indicating units, it is confirmed that the temporary storage time of the request in the storage unit ID_1 (i.e., request_a) is longer than the temporary storage time of the request in the storage unit ID_m (i.e., request_c). In addition, the temporary storage time of the request in the storage unit ID_m (i.e., request_c) is longer than the temporary storage time of the request in the storage unit ID_2 (i.e., the request_b). That is, in the request storage device 126, the storage unit ID_1 is the oldest used entry, and the request request_a is the oldest request. In addition, the storage unit ID_2 is the newest used entry, and the request request_b is the newest request. That is, the request request_b is the last request stored into the request storage device 126.

The operations of the controlling circuit 110 as shown in FIG. 1 will be described as follows. Firstly, the allocate controller 102 receives requests from plural requestors. The allocate controller 102 select a free entry according to the content of the request sequence table 122. Under control of the allocate controller 102, the request is temporarily stored in the corresponding storage unit, and the corresponding indicating unit is set. That is, the corresponding storage unit is set as a used entry. Generally, at the beginning when the out-of-order buffer 100 is enabled, all indicating units of the request sequence table 122 are not set. When the first request is received, the indicating unit in the first column (1st) of the first entry indicating row Entry_r1 is set by the allocate controller 102. Moreover, the first request is temporarily stored in the corresponding storage unit ID_1. Consequently, the storage unit ID_1 is the used entry.

Under control of the dispatch controller 106, the requests in the storage units ID_0~ID_m of the request storage device 126 are sent to the corresponding target devices in an out-of-order manner. After the request is implemented by the target device, the request is retired by the out-of-order buffer 100. In other words, after the request in the request storage device 126 is sent to the target device by the dispatch controller 106 and implemented, the request is retired by the deallocate controller 104.

According to the operation of the dispatch controller 106, the indicating unit in the request sequence table 122 is cleared by the deallocate controller 104. For example, after the request temporarily stored in the storage unit ID_m is transmitted to the target device by the dispatch controller 106 and the request is retired by the deallocate controller 104, the set indicating units in the m-th entry indicating row Entry_rm are cleared by the deallocate controller 104. Consequently, the logic values of the n indicating units in the m-th entry indicating row Entry_rm are changed to "0". Under this circumstance, the storage unit ID_m is changed to a free entry.

For example, if the request temporarily stored in the storage unit ID_m has not been retired, the logic value of the indicating unit in the first column (1 st) of the m-th entry indicating row Entry_rm is set as "1", and the logic values of the other (n−1) indicating units are all "0". Meanwhile, the storage unit ID_m is a used entry. After the request temporarily stored in the storage unit ID_m is retired, the logic value of the indicating unit in the first column (1st) of the m-th entry indicating row Entry_rm is cleared as "0" by the deallocate controller 104, and the logic values of the other (n−1) indicating units are maintained at "0". That is, the logic values of these n indicating units are all "0". Under this circumstance, the storage unit ID_m is a free entry.

Figure 3A:
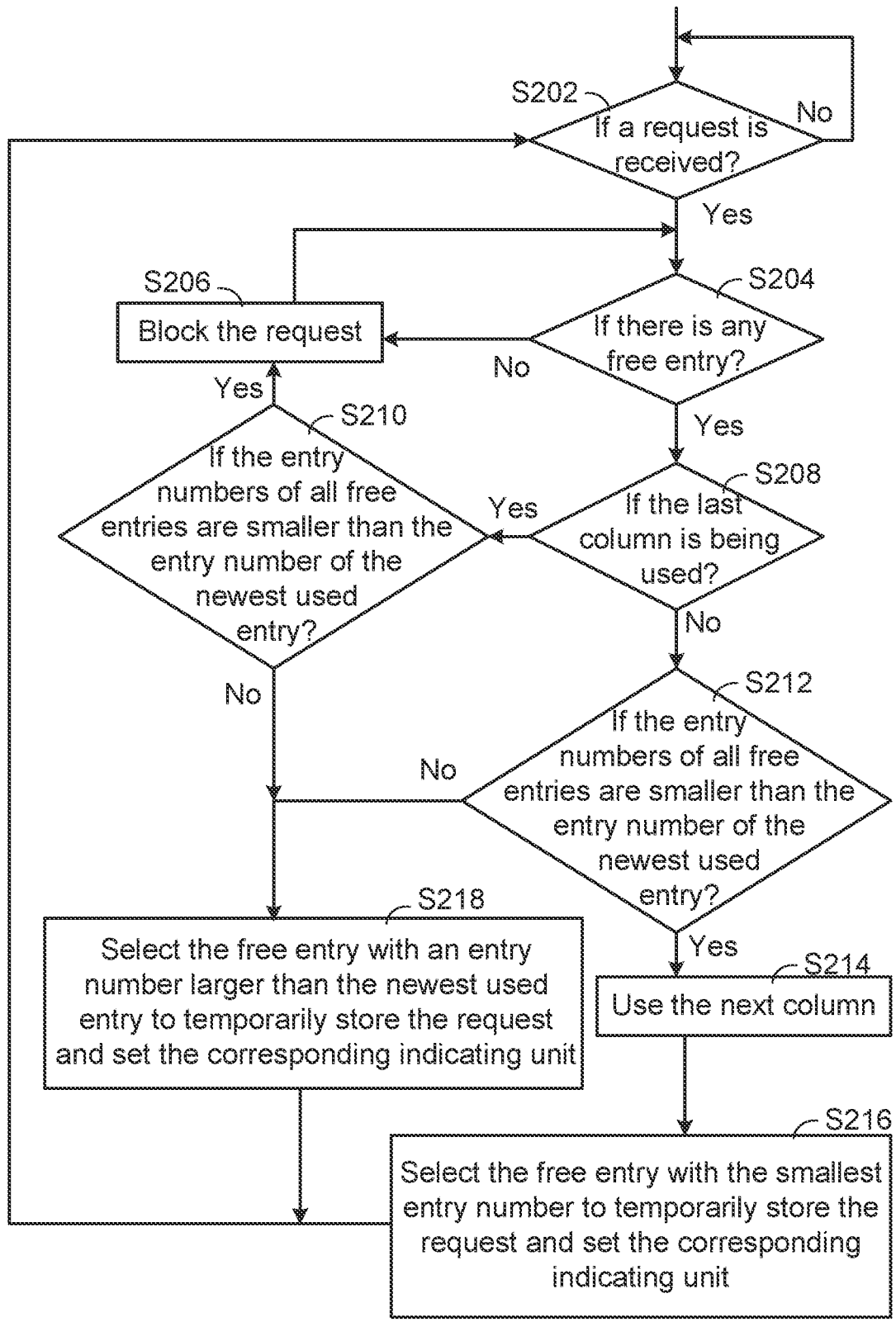
FIG. 3A is a flowchart illustrating a method for managing the request sequence table by the allocate controller of the out-of-order buffer according to the embodiment of the present invention.

FIG. 3A is a flowchart illustrating a method for managing the request sequence table by the allocate controller of the out-of-order buffer according to the embodiment of the present invention. FIG. 3B is a flowchart illustrating a method for managing the request sequence table by the deallocate controller of the out-of-order buffer according to the embodiment of the present invention.

Please refer to FIG. 3A. The method for managing the request sequence table 122 by the allocate controller 102 will be described as follows. Firstly, the allocate controller 102 judges whether a request is received (Step S202). If the allocate controller 102 receives a request from a requestor in the step S202, the allocate controller 102 judges whether there is any free entry according to the content of the request sequence table 122 (Step S204). If the judging result of the step S204 indicates that there is no free entry, it means that all of the storage units ID_0~ID_m in the request storage device 126 have temporarily stored requests. Since no request can be stored into the request storage device 126, the controlling circuit 110 blocks the request (Step S206). Since the request is blocked by the controlling circuit, the requestor stops issuing the request temporarily.

After the content of the request sequence table 122 is modified by the deallocate controller 104 and the allocate controller 102 confirms that there is any free entry, the controlling circuit 110 stops issuing the request blocking notification to the requestor. Meanwhile, the requestor can issue the request again, and the allocate controller 102 can receive the request again.

On the other hand, if the judging result of the step S204 indicates that there is any free entry, the allocate controller 102 whether the last column of the request sequence table 122 is being used (Step S208). Regardless of whether the judging condition of the step S208 is satisfied, a step S210 and a step S212 are performed to judge whether the entry numbers of all free entries are smaller than the entry number of the newest used entry. The entry number of the newest used entry represents the storage unit storing the previous request. In addition, the entry number of the newest used entry can be realized according to the content of the request sequence table 122.

If the judging result of the step S208 indicates that current used column is not the last column of the request sequence table 122 and the judging result of the step S212 indicates that the entry numbers of all free entries are smaller than the entry number of the newest used entry, the allocate controller 102 uses the next column of the request sequence table 122 as the new column (Step S214). Then, the free entry with the smallest entry number is selected to temporarily store the request, and the corresponding indicating unit is set (Step S216). After the step S216, the step S202 is repeatedly done.

If the judging result of the step S208 indicates that current used column is not the last column of the request sequence table 122 and the judging result of the step S212 indicates that the entry number of at least one free entry is not smaller than the entry number of the newest used entry, the free entry with an entry number larger than the newest used entry is selected to temporarily store the request, and the corresponding indicating unit is set (Step S218). After the step S218, the step S202 is repeatedly done.

If the judging result of the step S208 indicates that current used column is the last column of the request sequence table 122 and the judging result of the step S212 indicates that the entry number of at least one free entry is not smaller than the entry number of the newest used entry, the step S218 is performed.

If the judging result of the step S208 indicates that current used column is the last column of the request sequence table 122 and the judging result of the step S212 indicates that the entry numbers of all free entries are smaller than the entry number of the newest used entry, the storage units corresponding to these free entries cannot temporarily store requests. If these storage units are used to temporarily store requests, the storage sequence of the requests in the request sequence table 122 will be destroyed. Under this circumstance, it is necessary to perform the step S206 to block the requests.

Please refer to FIG. 3B. The method for managing the request sequence table 122 by the deallocate controller 104 will be described as follows. Firstly, the deallocate controller 104 judges whether a request is retired (Step S230). If the judging condition of the step S230 is satisfied, the deallocate controller 104 clears the indicating unit in the corresponding entry indicating row (Step S232). Consequently, the storage unit corresponding to the entry indicating row is changed from the used entry to the free entry. Then, the deallocate controller 104 judges whether there is any set indicating unit in the column corresponding to the cleared indicating unit (Step S236). If the judging condition of the step S236 is satisfied, it means that the indicating units in this column are not entirely cleared. The, the step S230 is repeatedly done.

Whereas, if the judging condition of the step S236 is not satisfied, it means that the indicating units in this column are all cleared. Then, the deallocate controller 104 shifts the content of the request sequence table 122 (Step S238). That is, all of the contents after this column in the request sequence table 122 are forward shifted for one column by the deallocate controller 104, and all indicating units in the last column are cleared.

Hereinafter, a process of inputting plural requests into the out-of-order buffer 100 and the process of managing the out-of-order queue 120 of the pout-of-order buffer 100 by the controlling circuit 110 will be illustrated with reference to two implementation examples.

Figure 4C:
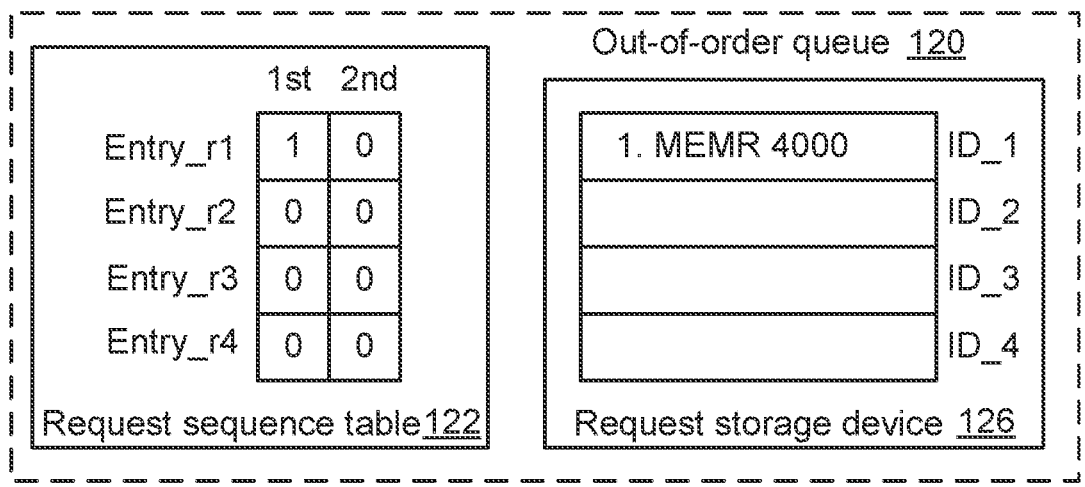
FIGS. 4A to 4O illustrate a first exemplary example of an operating process of the out-of-order buffer according to the embodiment of the present invention.
Figure 4D:
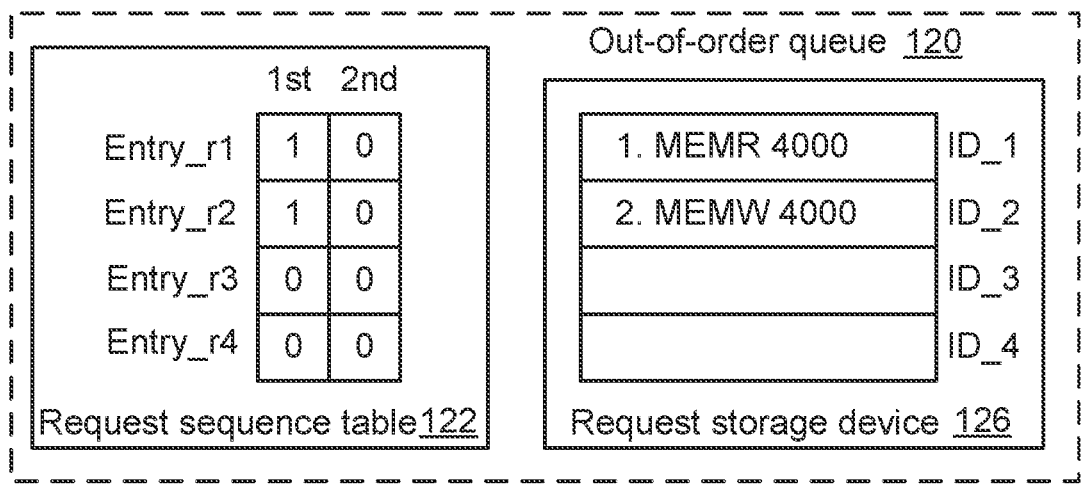
Figure 4E:
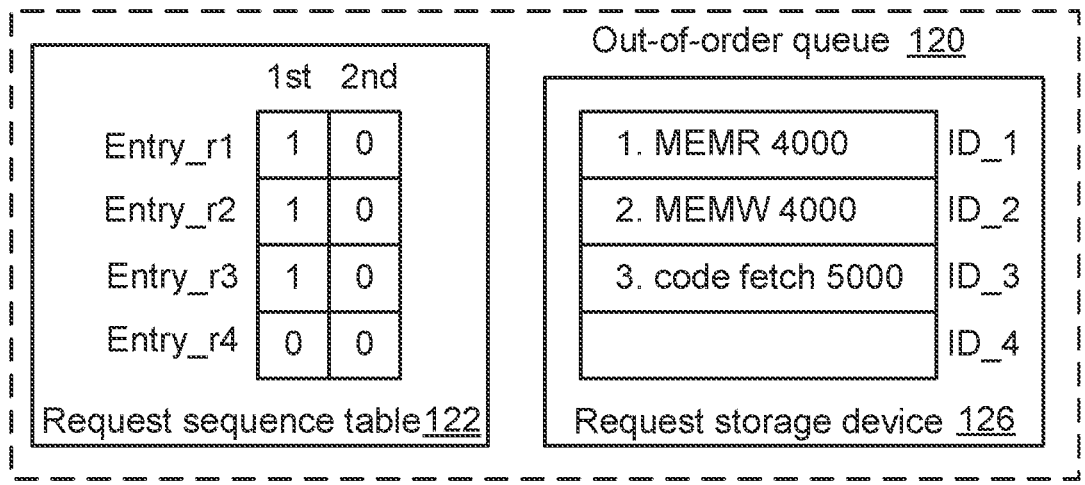
Figure 4F:
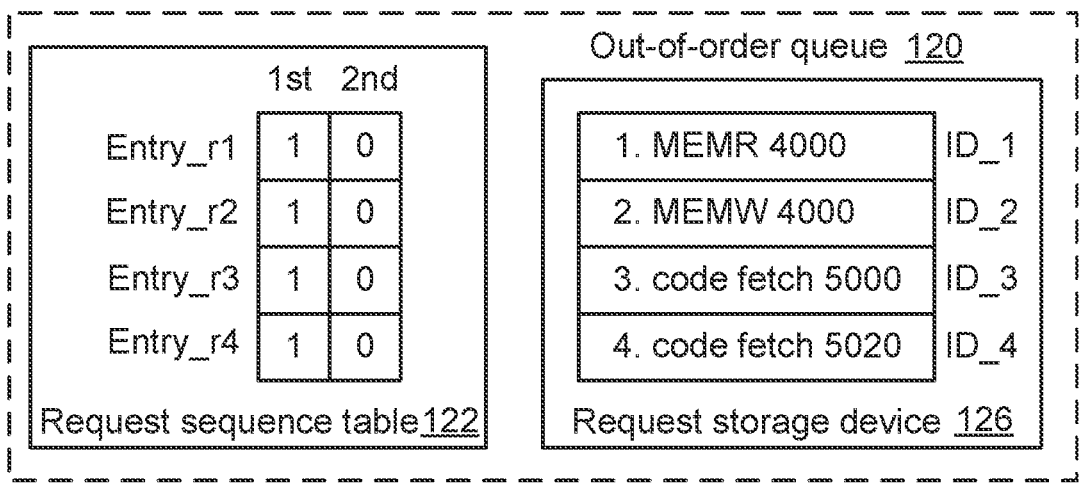
Figure 4G:
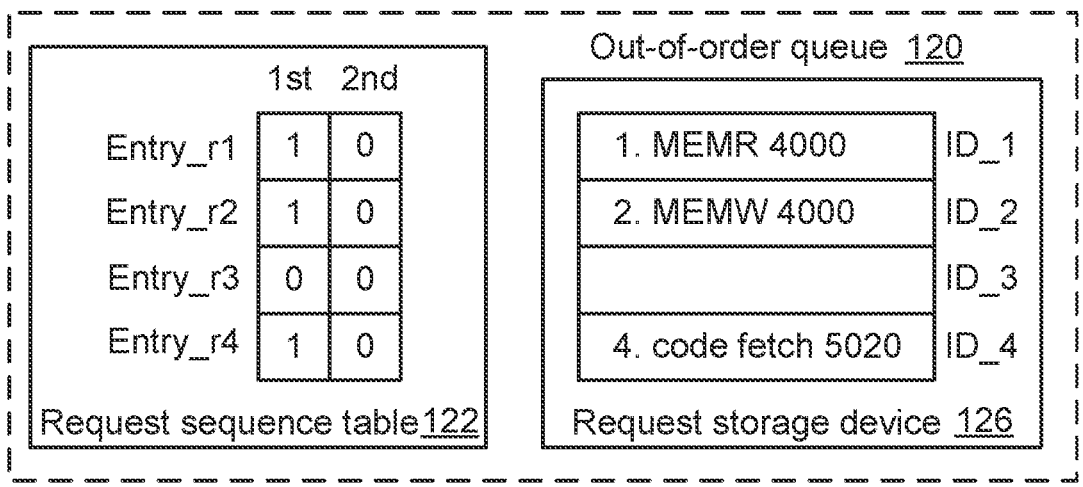
Figure 4H:
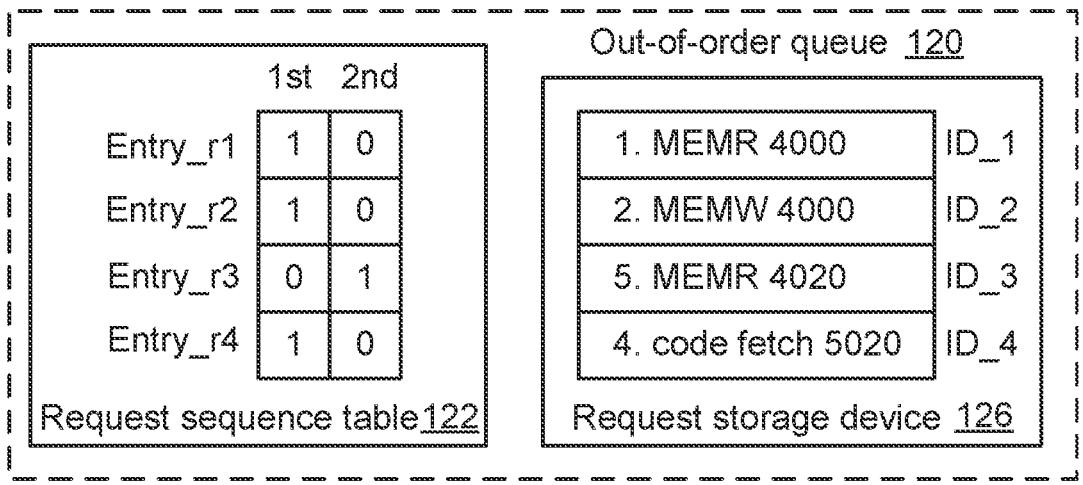
Figure 4I:
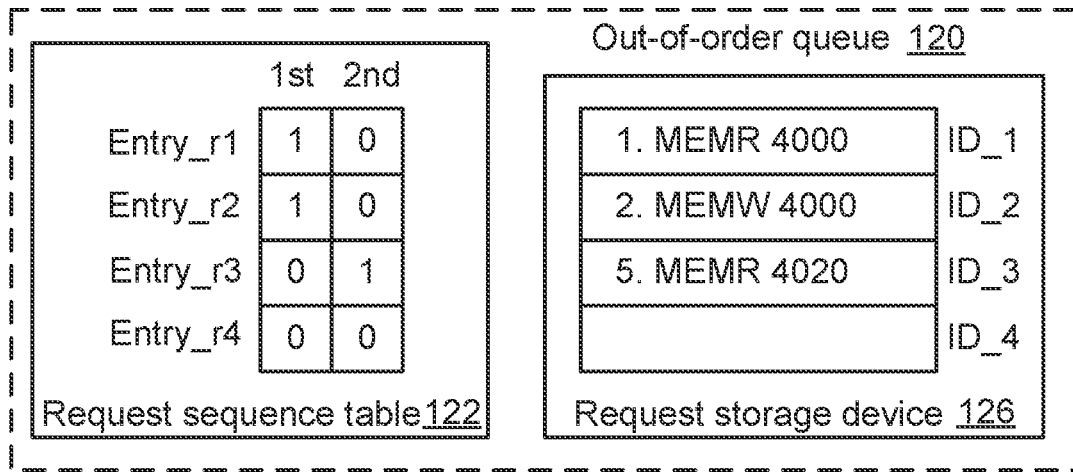
Figure 4J:
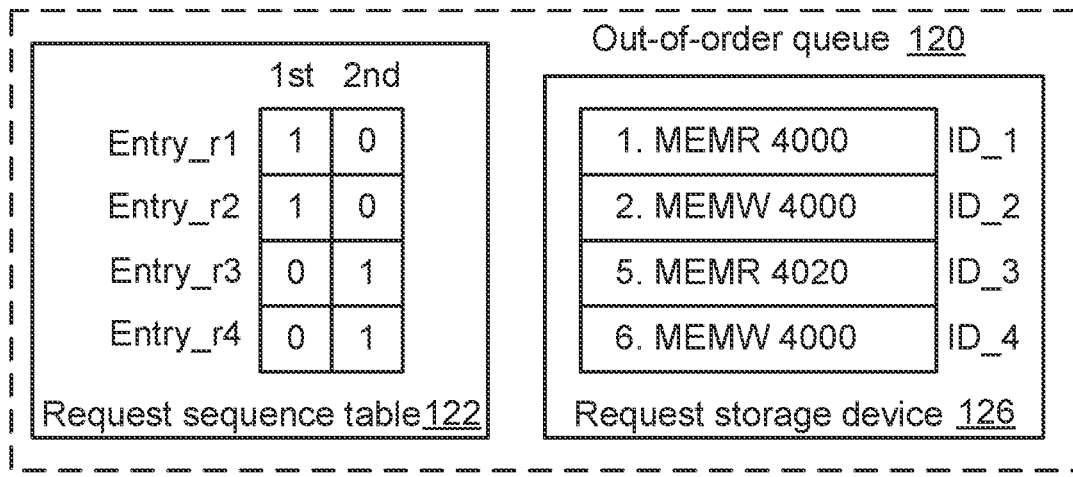
Figure 4K:
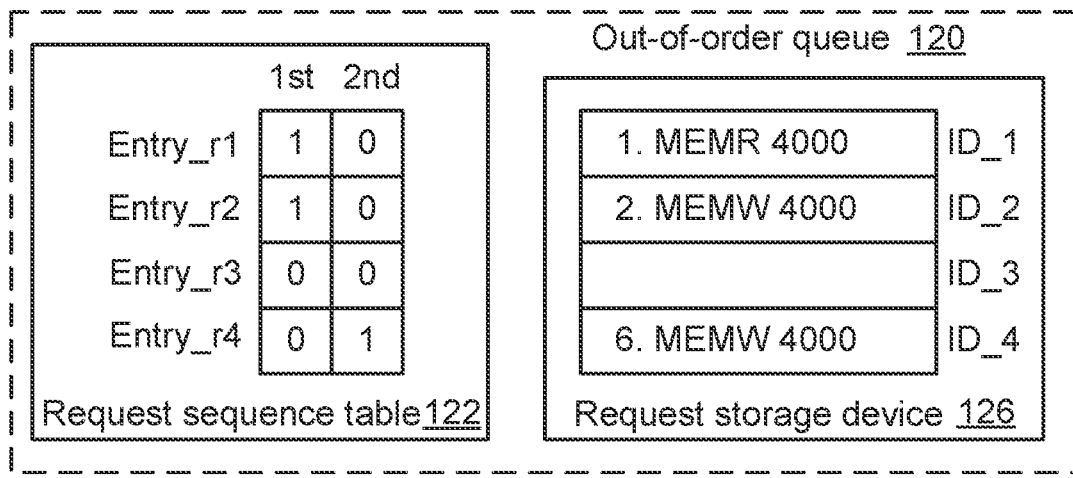
Figure 4L:
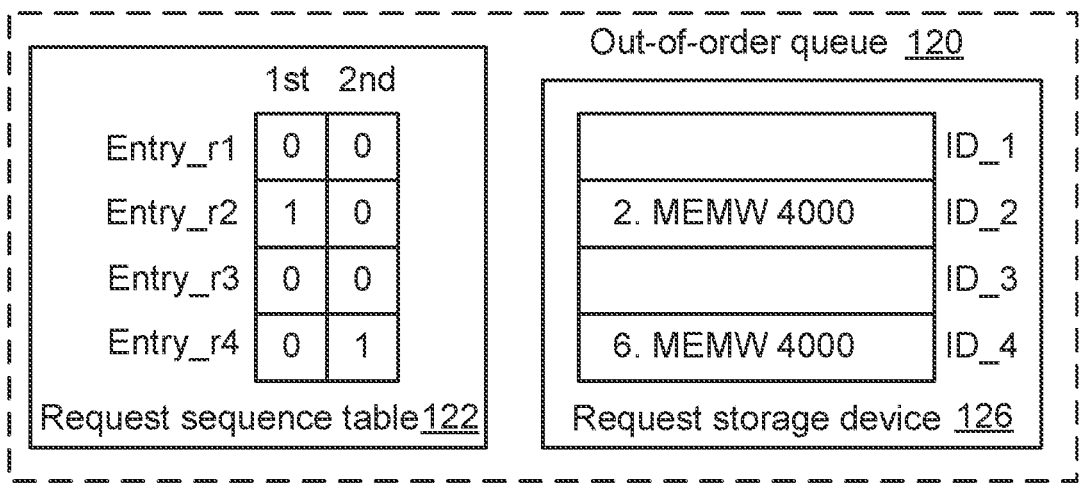
Figure 4M:
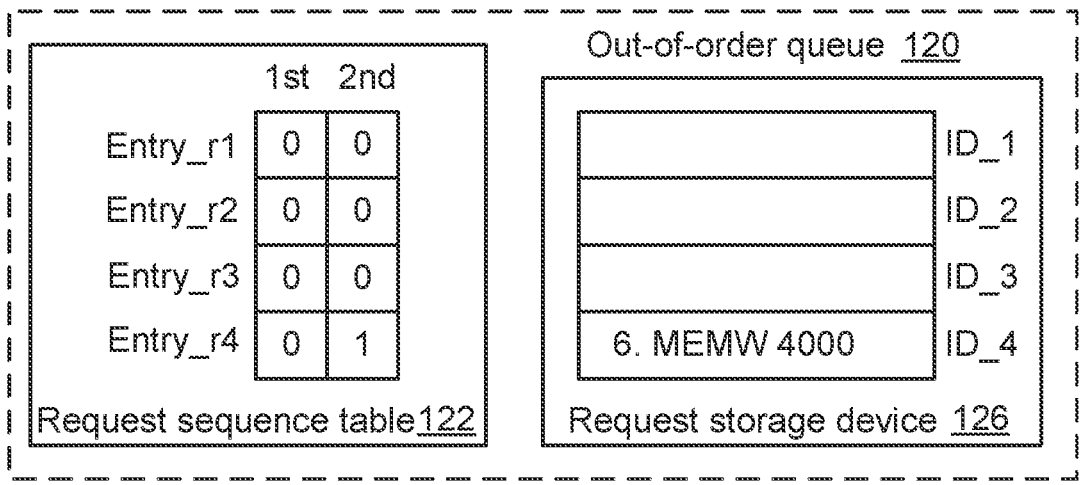
Figure 4N:
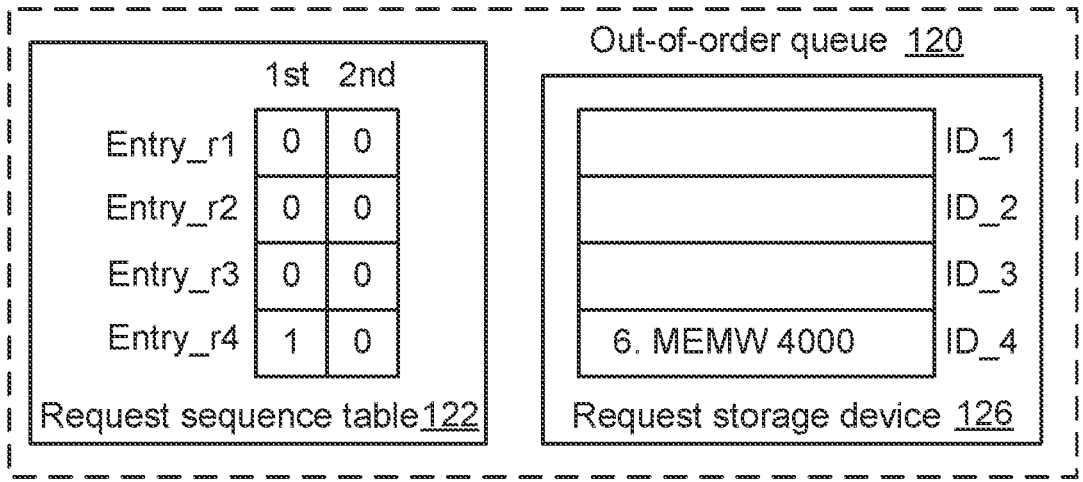
Figure 4O:
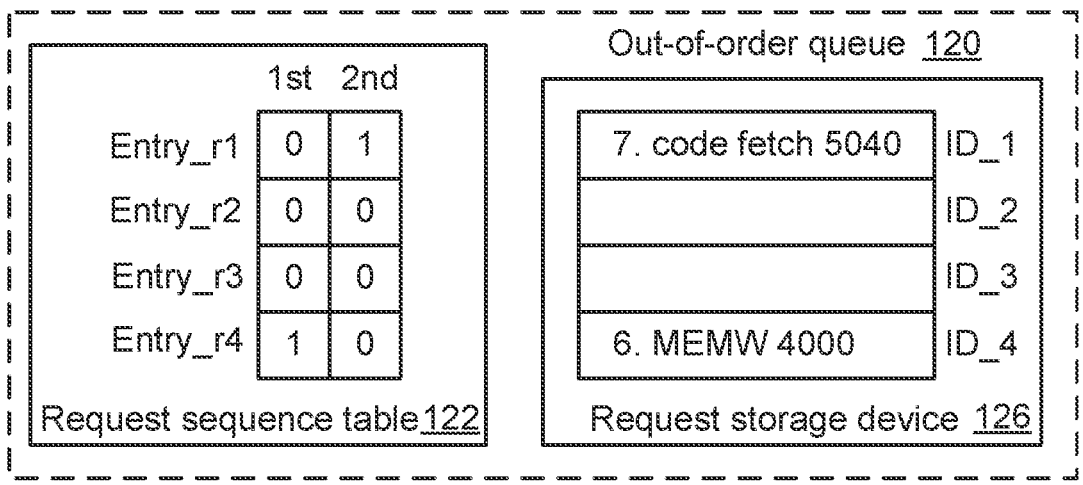

FIGS. 4A to 4O illustrate a first exemplary example of an operating process of the out-of-order buffer according to the embodiment of the present invention. In this embodiment, the request sequence table 122 of the out-of-order queue 120 comprises 4×2 indicating units. That is, the request sequence table 122 contains four entry indicating rows Entry_r1~Entry_r4. The four entry indicating rows Entry_r1~Entry_r4 are related to the four storage units ID_1~ID_m of the request storage device 126. Moreover, each of the four entry indicating rows Entry_r1~Entry_r4 contains two indicating units.

As shown in FIG. 4A, seven requests are sequentially inputted into the out-of-order buffer 100. The first request is a memory read request "MEMR 4000". The second request is a memory write request "MEMW 4000". The third request is a code fetch request "code fetch 5000". The fourth request is a code fetch request "code fetch 5020". The fifth request is a memory read request "MEMR 4020". The sixth request is a memory write request "MEMW 4000". The seventh request is a code fetch request "code fetch 5040". Moreover, the first request, second request and the sixth request are related to the read action and the write action at the same address "4000". Consequently, the first request, second request and the sixth request have dependencies on each other. Moreover, since the addresses related to the other requests are different, the other request do not have dependence.

As shown in FIG. 4B, no request is received by the out-of-order buffer 100. Meanwhile, all indicating units in the request sequence table 122 of the out-of-order queue 120 are not set. That is, the logic values of these indicating units are all "0". Under this circumstance, the four storage units ID_1-ID_4 of the request storage device 126 are free entries, and no requests are stored in the four storage units ID_1-ID_4.

Please refer to FIG. 4C. When the out-of-order buffer 100 receives the first request (MEMR 4000), the allocate controller 102 selects the storage unit ID_1 corresponding to the first entry indicating row Entry_1 to temporarily store the first request (MERM 4000). In addition, the logic value of the indicating unit in the first column (1st) of the first entry indicating row Entry_r1 is set as "1". According to the content of the request sequence table 122, the storage unit ID_1 is a used entry, and the storage unit ID_1 is the newest used entry. Consequently, the first request (MERM 4000) is temporarily stored into the storage unit ID_1. That is, the entry with the entry number 1 is the newest used entry.

As shown in FIG. 4D, the out-of-order buffer 100 receives the second request (MEMW 4000). Since the entry number 1 is related to the newest used entry, the allocate controller 102 selects the free entry (i.e., the storage unit ID_2) corresponding to the second entry indicating row Entry_2 to temporarily store the second request (MERW 4000). In addition, the logic value of the indicating unit in the first column (1st) of in the second entry indicating row Entry_r2 is set as "1". According to the request sequence table 122, the storage units ID_1 and ID_2 are used entries, and the storage unit ID_2 is the newest used entry. Consequently, the second request (MERW 4000) is temporarily stored into the storage unit ID_2. That is, the entry with the entry number 2 is the newest used entry.

As shown in FIG. 4E, the out-of-order buffer 100 receives the third request (code fetch 5000). Since the entry number 2 is related to the newest used entry, the allocate controller 102 selects the free entry (i.e., the storage unit ID_3) corresponding to the third entry indicating row Entry_3 to temporarily store the third request (code fetch 5000). In addition, the logic value of the indicating unit in the first column (1st) of the third entry indicating row Entry_r3 is set as "1". According to the request sequence table 122, the storage units ID_1, ID_2 and ID_3 are used entries, and the storage unit ID_3 is the newest used entry. Consequently, the third request (code fetch 5000) is temporarily stored into the storage unit ID_3. That is, the entry with the entry number 3 is the newest used entry.

As shown in FIG. 4F, the out-of-order buffer 100 receives the fourth request (code fetch 5020). Since the entry number 3 is related to the newest used entry, the allocate controller 102 selects the free entry (i.e., the storage unit ID_4) corresponding to the fourth entry indicating row Entry_4 to temporarily store the fourth request (code fetch 5020). In addition, the logic value of the indicating unit in the first column (1st) in the fourth entry indicating row Entry_4 is set as "1". According to the request sequence table 122, the storage units ID_1, ID_2, ID_3 and ID_4 are used entries, and the storage unit ID_4 is the newest used entry. Consequently, the fourth request (code fetch 5020) is temporarily stored into the storage unit ID_4. That is, the entry with the entry number 4 is the newest used entry.

As can be seen from the request sequence table 122 in FIG. 4F, all of the four storage units ID_1-ID_4 are the used entries, and no free entry is included in the request storage device 126. Under this circumstance, the controlling circuit 110 blocks the request, and the requestor stops issuing the request temporarily.

As shown in FIG. 4G, the request in the storage unit ID_3 is transmitted to the target device by the dispatch controller 106. Consequently, the request is retired by the deallocate controller 104. Meanwhile, the indicating unit in the third entry indicating row Entry_r3 is cleared by the deallocate controller 104. In other words, the logic value of the indicating unit in the first column (1st) of the third entry indicating row Entry_r3 is cleared as "0". According to the request sequence table 122, the storage units ID_1, ID_2 and ID_4 are the used entries, the storage unit ID_3 is the free entry, and the storage unit ID_4 is the newest used entry. That is, the entry with the entry number 4 is the newest used entry, and the entry with the entry number 3 is the free entry.

As can be seen from the request sequence table 122 in FIG. 4G, the storage unit ID_3 is changed to the free entry. In addition, the indicating unit in the first column (1st) (not the last column) has been used by the allocate controller 102.

Under this circumstance, the controlling circuit 110 stops blocking the request. Consequently, the requestor can issue the request again.

As shown in FIG. 4H, the out-of-order buffer 100 receives the fifth request (MEMR 4020). Since the entry number 4 is related to the newest used entry and the entry number 3 is related to the free entry, the indicating unit in the next column (i.e., the second column (2nd)) of the request sequence table 122 is set by the allocate controller 102. Moreover, the allocate controller 102 selects the free entry (i.e., the storage unit ID_3) corresponding to the third entry indicating row Entry_3 to temporarily store the fifth request (MEMR 4020). In addition, the logic value of the indicating unit in the second column (2nd) of the third entry indicating row Entry_3 is set as "1". According to the request sequence table 122, the storage units ID_1, ID_2, ID_3 and ID_4 are the used entries, and the storage unit ID_3 is the newest used entry. Consequently, the fifth request (MEMR 4020) is temporarily stored into the storage unit ID_3. That is, the entry with the entry number 3 is the newest used entry.

As can be seen from the request sequence table 122 in FIG. 4H, the four storage units ID_1-ID_4 are the used entries, and no free entry is included in the request storage device 126. Under this circumstance, the controlling circuit 110 blocks the request, and the requestor stops issuing the request temporarily.

As shown in FIG. 4I, the request in the storage unit ID_4 has been transmitted to the target device by the dispatch controller 106. Consequently, the request is retired by the deallocate controller 104. Meanwhile, the indicating unit in the fourth entry indicating row Entry_r4 is cleared by the deallocate controller 104. In other words, the logic value of the indicating unit in the first column (1st) of the fourth entry indicating row Entry_r4 is cleared as "0". According to the request sequence table 122, the storage units ID_1, ID_2 and ID_3 are the used entries, the storage unit ID_4 is the free entry, and the storage unit ID_3 is the newest used entry. That is, the entry with the entry number 3 is the newest used entry, and the entry with the entry number 4 is the free entry.

As can be seen from the request sequence table 122 in FIG. 4I, the entry with the entry number 3 is the newest entry, and the entry with the entry number 4 is the free entry. Moreover, the entry number 4 is larger than the entry number 3. Under this circumstance, the controlling circuit 110 stops blocking the request. Consequently, the requestor can issue the request again.

As shown in FIG. 4J, the out-of-order buffer 100 receives the sixth request (MEMW 4000). Since the entry number 3 is related to the newest used entry, the allocate controller 102 selects the free entry (i.e., the storage unit ID_4) corresponding to the fourth entry indicating row Entry_4 to temporarily store the sixth request (MEMW 4000). In addition, the logic value of the indicating unit in the second column (2nd) of the fourth entry indicating row Entry_4 is set as "1". According to the request sequence table 122, the storage units ID_1, ID_2, ID_3 and ID_4 are the used entries, and the storage unit ID_4 is the newest used entry. Consequently, the sixth request (MEMW 4000) is temporarily stored into the storage unit ID_4. That is, the entry with the entry number 4 is the newest used entry.

As can be seen from the request sequence table 122 in FIG. 4J, the four storage units ID_1-ID_4 are the used entries, and no free entry is included in the request storage device 126. Under this circumstance, the controlling circuit 110 blocks the request, and the requestor stops issuing the request temporarily.

As shown in FIG. 4K, the request in the storage unit ID_3 has been transmitted to the target device by the dispatch controller 106. Consequently, the request is retired by the deallocate controller 104. Meanwhile, the indicating unit in the third entry indicating row Entry_r3 is cleared by the deallocate controller 104. In other words, the logic value of the indicating unit in the second column (2nd) of the third entry indicating row Entry_r3 is cleared as "0". According to the request sequence table 122, the storage units ID_1, ID_2 and ID_4 are the used entries, and the storage unit ID_3 is the free entry, and the storage unit ID_4 is the newest used entry. That is, the entry with the entry number 4 is the newest used entry, and the entry with the entry number 3 is the free entry.

As can be seen from the request sequence table 122 in FIG. 4K, the indicating unit in the second column (2nd) (i.e., the last column) has been used by the allocate controller 102, the entry number 4 is related to the newest entry, and the entry number 3 is related to the free entry. Moreover, the entry number 3 is smaller than the entry number 4. Although there is the free entry according to the content of the request sequence table 122, the controlling circuit 110 continuously blocks the request. Consequently, the requestor stops issuing the request temporarily.

As shown in FIG. 4L, the request of the storage unit ID_1 has been transmitted to the target device by the dispatch controller 106. Consequently, the request is retired by the deallocate controller 104. Meanwhile, the indicating unit in the first entry indicating row Entry_r1 is cleared by the deallocate controller 104. In other words, the logic value of the indicating unit in the first column (1st) of the first entry indicating row Entry_r1 is cleared as "0". According to the request sequence table 122, the storage units ID_2 and ID_4 are the used entries, the storage units ID_1 and ID_3 are the free entries, and the storage unit ID_4 is the newest used entry. That is, the entry with the entry number 4 is the newest used entry, and the entries with the entry number 1 and the entry number 3 are the free entries.

As can be seen from the request sequence table 122 in FIG. 4L, the indicating unit in the second column (2nd) (i.e., the last column) has been used by the allocate controller 102, the entry number 1 and the entry number 3 are related to the free entries, and the entry number 4 is related to the newest entry. Moreover, the entry number 1 and the entry number 3 are smaller than the entry number 4. Although there is the free entry according to the content of the request sequence table 122, the controlling circuit 110 continuously blocks the request. Consequently, the requestor stops issuing the request temporarily.

As shown in FIG. 4M, the request of the storage unit ID_2 has been transmitted to the target device by the dispatch controller 106. Consequently, the request is retired by the deallocate controller 104. Meanwhile, the indicating unit in the second entry indicating row Entry_r2 is cleared by the deallocate controller 104. In other words, the logic value of the indicating unit in the first column (1st) of the second entry indicating row Entry_r2 is cleared as "0". According to the request sequence table 122, the storage units ID_1, ID_2 and ID_3 are the free entries, and the storage unit ID_4 is the newest entry. That is, the entry with the entry number 4 is the newest used entry, and the entries with the entry number 1, the entry number 2 and the entry number 3 are the free entries.

As can be seen from the request sequence table 122 in FIG. 4M, the indicating unit in the second column (i.e., the last column) has been used by the allocate controller 102, the entry number 1, the entry number 2 and the entry number 3 are related to the free entries, and the entry number 4 is related to the newest entry. Moreover, the entry number 1, the entry number 2 and the entry number 3 are smaller than the entry number 4. Although there is the free entry according to the content of the request sequence table 122, the controlling circuit 110 continuously blocks the request. Consequently, the requestor stops issuing the request temporarily.

As shown in FIG. 4N, the request of the storage unit ID_2 is retired by the deallocate controller 104. According to the request sequence table 122, the logic values of all indicating units in the first column (1st) are cleared as "0". Then, the contents of the request sequence table 122 are shifted by the deallocate controller 104. As shown in FIG. 4N, all of the contents after the first column (1st) in the request sequence table 122 are forward shifted for one column by the deallocate controller 104, and all indicating units in the last column are cleared. After the contents of the request sequence table 122 are shifted, the indicating units in the first column (1st) will be used by the allocate controller 102. According to the request sequence table 122, the storage units ID_1, ID_2 and ID_3 are the free entries, and the storage unit ID_4 is the newest entry. That is, the entry with the entry number 4 is the newest used entry, and the entries with the entry number 1, the entry number 2 and the entry number 3 are the free entries.

As can be seen from the request sequence table 122 in FIG. 4N, the indicating unit in the first column (1st) (not the last column) is set by the allocate controller 102. Under this circumstance, the controlling circuit 110 stops blocking the request. Consequently, the requestor can issue the request again.

As shown in FIG. 4O, the out-of-order buffer 100 receives the seventh request (code fetch 5040). Since the entry number 4 is related to the newest used entry and the entry numbers 1, 2 and 3 are related to the free entries, the indicating units in the second column (2nd) will be set by the allocate controller 102. Then, the allocate controller 102 selects the free entry (i.e., the storage unit ID_1) corresponding to the first entry indicating row Entry_1 to temporarily store the seventh request (code fetch 5040). In addition, the logic value of the indicating unit in the second column (2nd) of the first entry indicating row Entry_1 is set as "1". According to the request sequence table 122, the storage units ID_1 and ID_4 are used entries, and the storage unit ID_1 is the newest used entry. Consequently, the seventh request (code fetch 5040) is temporarily stored into the storage unit ID_1. That is, the entry with the entry number 1 is the newest used entry, and the entries with the entry number 2 and the entry number 3 are the free entries.

From the above descriptions, the present invention provides an out-of-order buffer 100 and the associated management method. The request sequence table 122 of the out-of-order queue 120 can effectively record that the storage units ID_1~ID_m are the free entries or the used entries. Moreover, the request sequence table 122 can effectively record the storage sequence of the used entries of the storage units ID_1~ID_m.

FIGS. 5A to 5K illustrate a second exemplary example of an operating process of the out-of-order buffer according to the embodiment of the present invention. In this embodiment, the request sequence table 122 of the out-of-order queue 120 comprises 4×3 indicating units. That is, the request sequence table 122 contains four entry indicating rows Entry_r1~Entry_r4. The four entry indicating rows Entry_r1~Entry_r4 are related to the four storage units ID_1~ID_m of the request storage device 126. Moreover, each of the four entry indicating rows Entry_r1~Entry_r4 contains three indicating units. Like the example of FIG. 4A, seven requests are sequentially inputted into the out-of-order buffer 100.

Figure 5A:
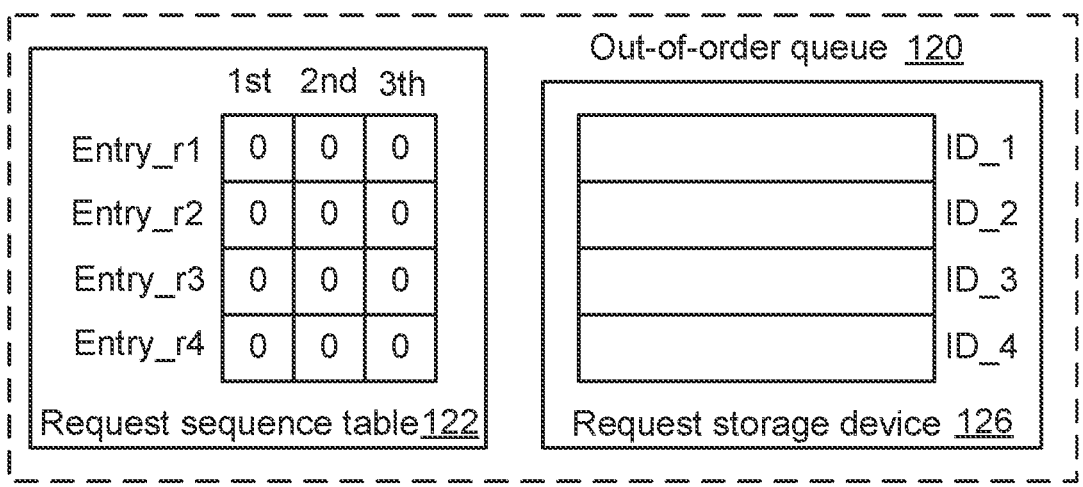
FIGS. 5A to 5K illustrate a second exemplary example of an operating process of the out-of-order buffer according to the embodiment of the present invention.

As shown in FIG. 5A, no request is received by the out-of-order buffer 100. Meanwhile, all indicating units in the request sequence table 122 of the out-of-order queue 120 are not set. That is, the logic values of these indicating units are all "0". Under this circumstance, the four storage units ID_1-ID_4 of the request storage device 126 are free entries, and no requests are stored in the four storage units ID_1-ID_4.

Figure 5B:
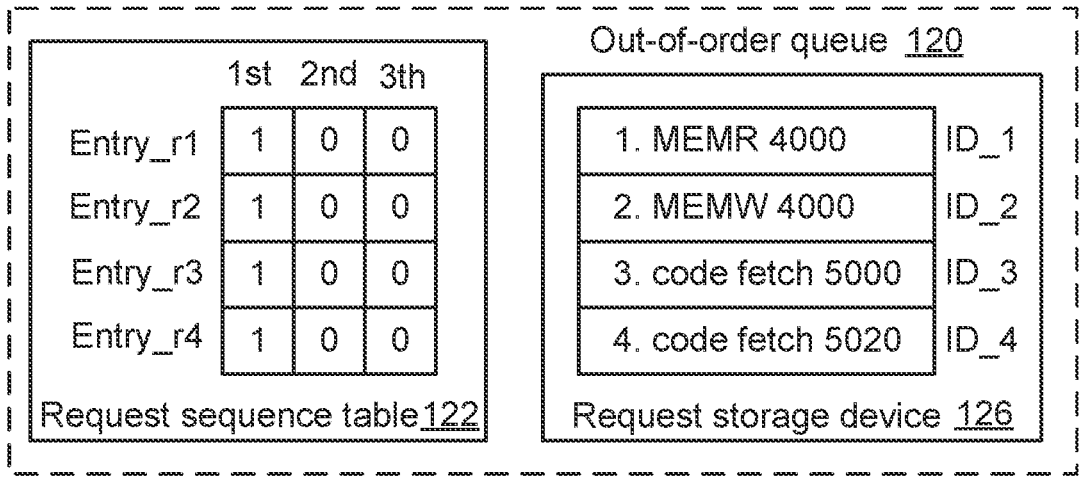

Please refer to FIG. 5B. The operating process of the out-of-order buffer 100 in FIG. 5B is similar to the operating processes in FIGS. 4C, 4D, 4E and 4F. When the four requests (MEMR 4000, MEMW 4000, code fetch 5000 and code fetch 5020) are sequentially received by the out-of-order buffer 100, the allocate controller 102 selects the storage unis ID_1 to ID_4 to temporarily store the four requests (MEMR 4000, MEMW 4000, code fetch 5000 and code fetch 5020), respectively. Moreover, in the four entry indicating rows Entry_1~Entry_4, the logic values of the indicating units in the first column (1st) are set as "1". According to the content of the request sequence table 122, the storage units ID_1-ID_4 are used entries, and the fourth storage unit ID_4 is the newest used entry. Consequently, the fourth request (code fetch 5020) is temporarily stored into the storage unit ID_4. That is, the entry with the entry number 4 is the newest used entry.

As can be seen from the request sequence table 122 in FIG. 5B, all of the four storage units ID_1-ID_4 are the used entries, and no free entry is included in the request storage device 126. Under this circumstance, the controlling circuit 110 blocks the request, and the requestor stops issuing the request temporarily.

Figure 5C:
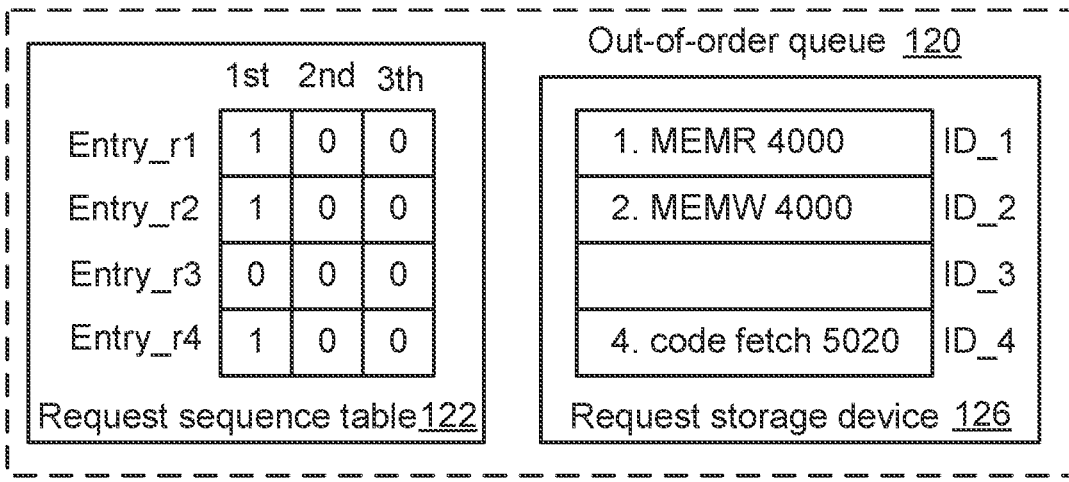

As shown in FIG. 5C, the request in the storage unit ID_3 is transmitted to the target device by the dispatch controller 106. Consequently, the request is retired by the deallocate controller 104. Meanwhile, the indicating unit in the third entry indicating row Entry_r3 is cleared by the deallocate controller 104. In other words, the logic value of the indicating unit in the first column (1st) of the third entry indicating row Entry_r3 is cleared as "0". According to the request sequence table 122, the storage units ID_1, ID_2 and ID_4 are the used entries, the storage unit ID_3 is the free entry, and the storage unit ID_4 is the newest used entry. That is, the entry with the entry number 4 is the newest used entry, and the entry with the entry number 3 is the free entry.

As can be seen from the request sequence table 122 in FIG. 5C, the storage unit ID_3 is changed to the free entry. In addition, the indicating unit in the first column (1st) (not the last column) has been used by the allocate controller 102. Under this circumstance, the controlling circuit 110 stops blocking the request. Consequently, the requestors can issue the request again.

Figure 5D:
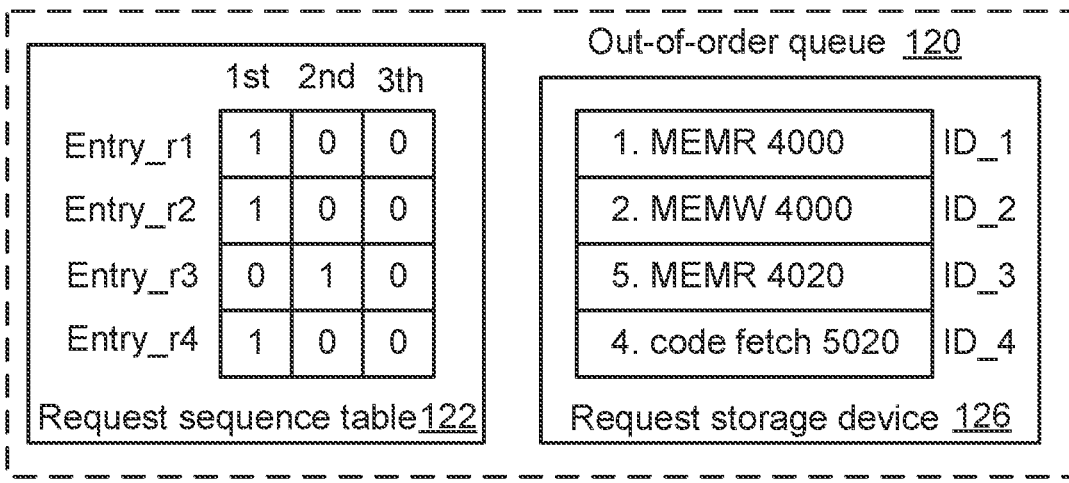

As shown in FIG. 5D, the out-of-order buffer 100 receives the fifth request (MEMR 4020). Since the entry number 4 is related to the newest used entry and the entry number 3 is related to the free entry (i.e., the entry number 3 is smaller than the entry number 4), the indicating unit in the next column (i.e., the second column) of the request sequence table 122 is set by the allocate controller 102. Moreover, the allocate controller 102 selects the free entry (i.e., the storage unit ID_3) corresponding to the third entry indicating row Entry_3 to temporarily store the fifth request (MEMR 4020). In addition, the logic value of the indicating unit in the second column (2nd) of the third entry indicating row Entry_3 is set as "1". According to the request sequence table 122, the storage units ID_1, ID_2, ID_3 and ID_4 are the used entries, and the storage unit ID_3 is the newest used entry. Consequently, the fifth request (MEMR 4020) is temporarily stored into the storage unit ID_3. That is, the entry with the entry number 3 is the newest used entry.

As can be seen from the request sequence table 122 in FIG. 5D, the four storage units ID_1-ID_4 are the used entries, and no free entry is included in the request storage device 126. Under this circumstance, the controlling circuit 110 blocks the request, and the requestor stops issuing the request temporarily.

Figure 5E:
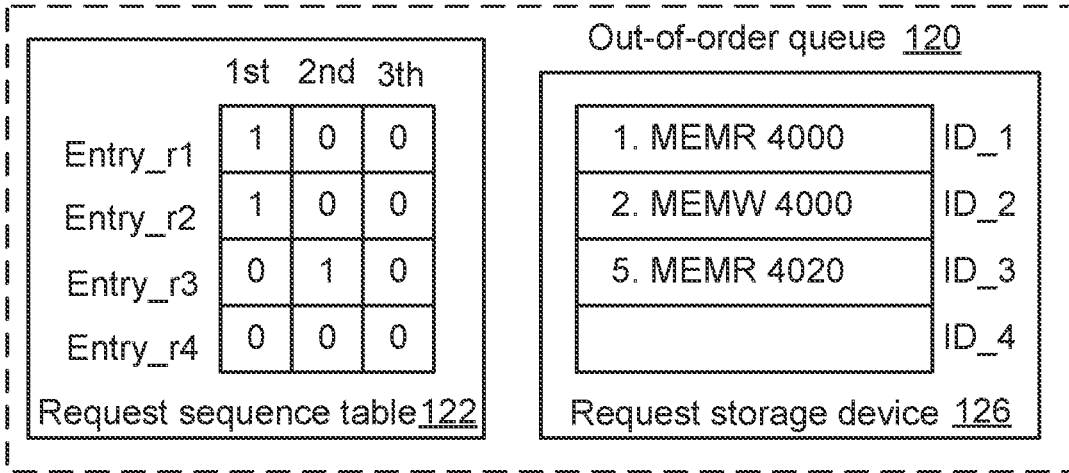

As shown in FIG. 5E, the request in the storage unit ID_4 has been transmitted to the target device by the dispatch controller 106. Consequently, the request is retired by the deallocate controller 104. Meanwhile, the indicating unit in the fourth entry indicating row Entry_r4 is cleared by the deallocate controller 104. In other words, the logic value of the indicating unit in the first column (1st) of the fourth entry indicating row Entry_r4 is cleared as "0". According to the request sequence table 122, the storage units ID_1, ID_2 and ID_3 are the used entries, the storage unit ID_4 is the free entry, and the storage unit ID_3 is the newest used entry. That is, the entry with the entry number 3 is the newest used entry, and the entry with the entry number 4 is the free entry.

As can be seen from the request sequence table 122 in FIG. 5E, the entry with the entry number 3 is the newest entry, and the entry with the entry number 4 is the free entry. Moreover, the entry number 4 is larger than the entry number 3. Under this circumstance, the controlling circuit 110 stops blocking the request. Consequently, the requestor can issue the request again.

Figure 5F:
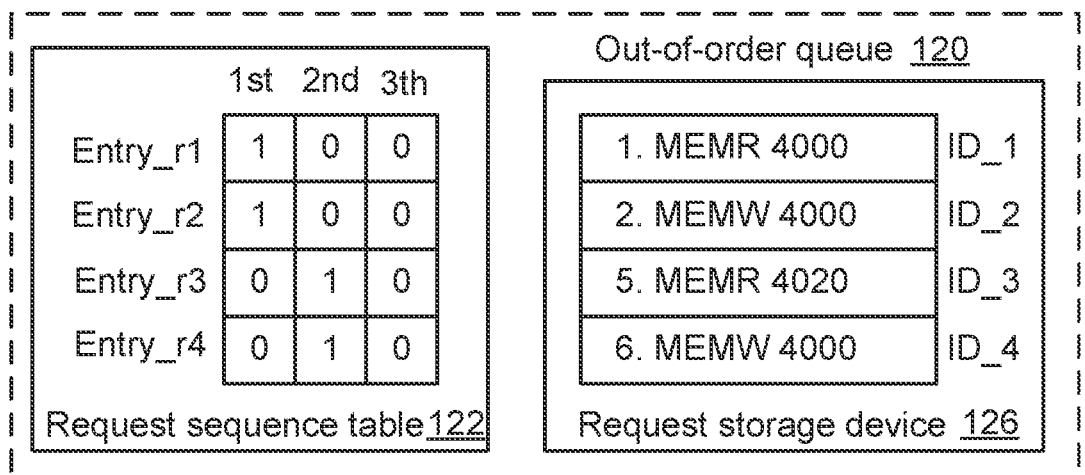

As shown in FIG. 5F, the out-of-order buffer 100 receives the sixth request (MEMW 4000). Since the entry number 3 is related to the newest used entry, the allocate controller 102 selects the free entry (i.e., the storage unit ID_4) corresponding to the fourth entry indicating row Entry_4 to temporarily store the sixth request (MEMW 4000). In addition, the logic value of the indicating unit in the second column (2nd) of the fourth entry indicating row Entry_4 is set as "1". According to the request sequence table 122, the storage units ID_1, ID_2, ID_3 and ID_4 are the used entries, and the storage unit ID_4 is the newest used entry. Consequently, the sixth request (MEMW 4000) is temporarily stored into the storage unit ID_4. That is, the entry with the entry number 4 is the newest used entry.

As can be seen from the request sequence table 122 in FIG. 5F, the four storage units ID_1-ID_4 are the used entries, and no free entry is included in the request storage device 126. Under this circumstance, the controlling circuit 110 blocks the request, and thus the requestor stops issuing the request temporarily.

Figure 5G:
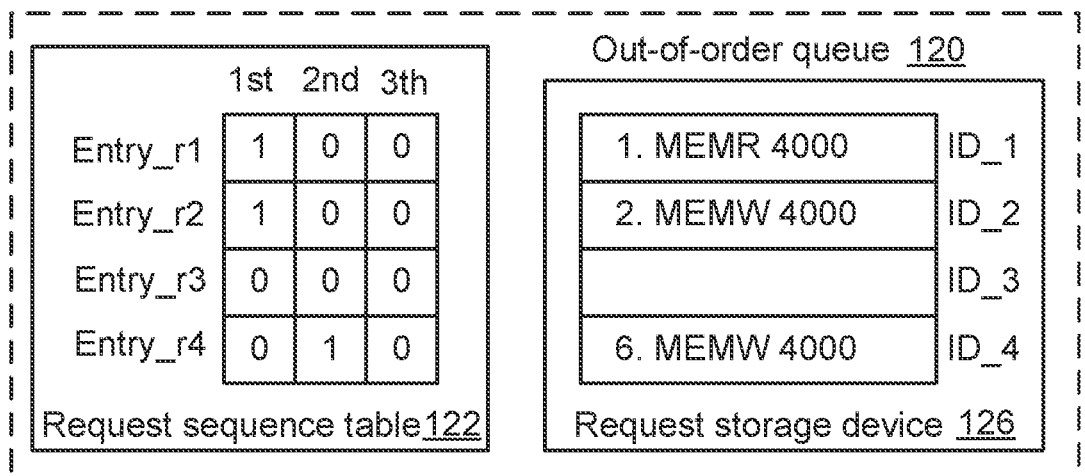

As shown in FIG. 5G, the request in the storage unit ID_3 has been transmitted to the target device by the dispatch controller 106. Consequently, the request is retired by the deallocate controller 104. Meanwhile, the indicating unit in the third entry indicating row Entry_r3 is cleared by the deallocate controller 104. In other words, the logic value of the indicating unit in the second column (2nd) of the third entry indicating row Entry_r3 is cleared as "0". According to the request sequence table 122, the storage units ID_1, ID_2 and ID_4 are the used entries, and the storage unit ID_3 is the free entry, and the storage unit ID_4 is the newest used entry. That is, the entry with the entry number 4 is the newest used entry, and the entry with the entry number 3 is the free entry.

Figure 5H:
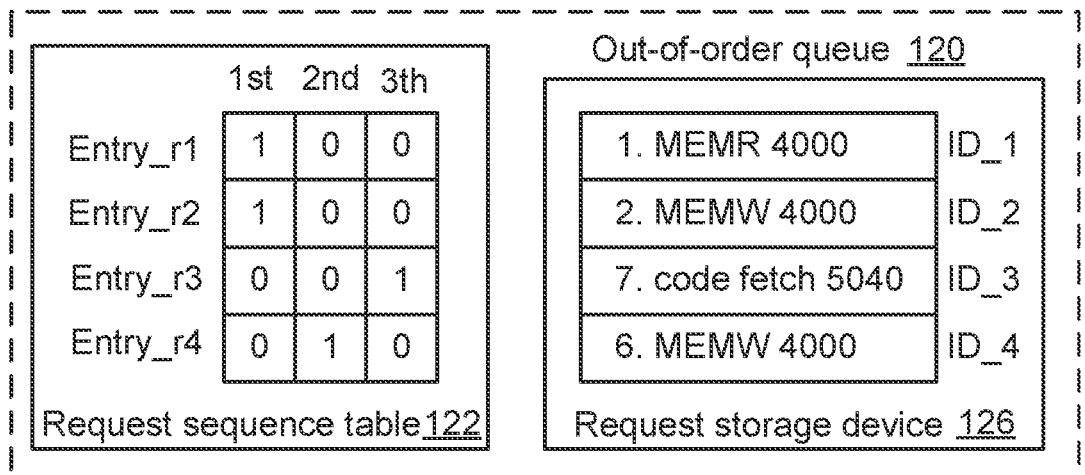

As shown in FIG. 5H, the out-of-order buffer 100 receives the seventh request (code fetch 5040). Since the entry number 4 is related to the newest used entry and the entry number 3 is related to the free entry (i.e., the entry number 3 is smaller than the entry number 4), the indicating unit in the next column (i.e., the third column 3rd) of the request sequence table 122 is set by the allocate controller 102. Moreover, the allocate controller 102 selects the free entry (i.e., the storage unit ID_3) corresponding to the third entry indicating row Entry_3 to temporarily store the seventh request (code fetch 5040). In addition, the logic value of the indicating unit in the third column 3rd of the third entry indicating row Entry_3 is set as "1". According to the request sequence table 122, the storage units ID_1, ID_2 and ID_3 are the used entries, and the storage unit ID_3 is the newest used entry. Consequently, the seventh request (code fetch 5040) is temporarily stored into the storage unit ID_3. That is, the entry with the entry number 3 is the newest used entry.

As can be seen from the request sequence table 122 in FIG. 5H, all of the four storage units ID_1-ID_4 are the used entries, and no free entry is included in the request storage device 126. Under this circumstance, the controlling circuit 110 blocks the request, and thus the requestor stops issuing the request temporarily.

Figure 5I:
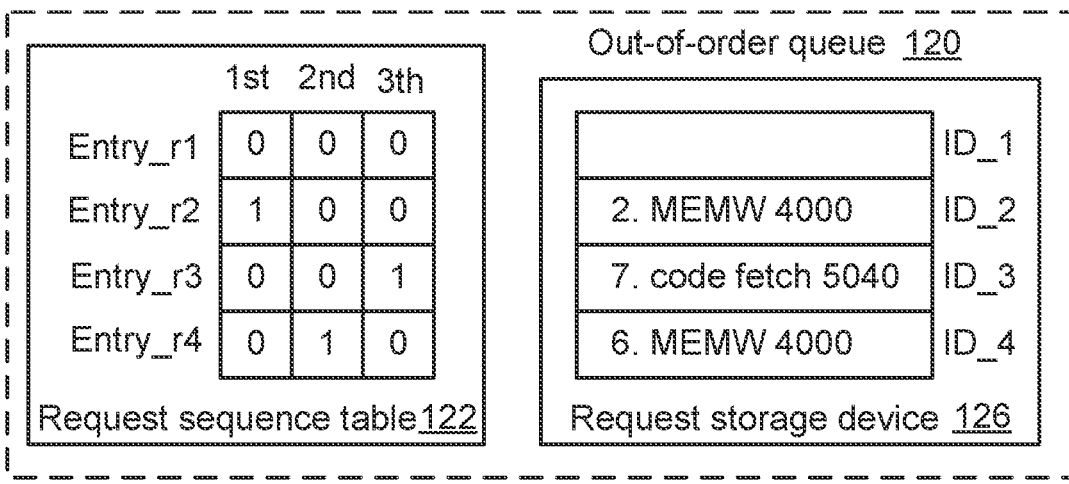

As shown in FIG. 5I, the request in the storage unit ID_1 has been transmitted to the target device by the dispatch controller 106. Consequently, the request is retired by the deallocate controller 104. Meanwhile, the indicating unit in the first entry indicating row Entry_r1 is cleared by the deallocate controller 104. In other words, the logic value of the indicating unit in the first column (1st) of the first entry indicating row Entry_r1 is cleared as "0". According to the request sequence table 122, the storage units ID_2, ID_3 and ID_4 are the used entries, and the storage unit ID_1 is the free entry, and the storage unit ID_3 is the newest used entry. That is, the entry with the entry number 3 is the newest used entry, and the entry with the entry number 1 is the free entry.

As can be seen from the request sequence table 122 in FIG. 5I, the indicating unit in the third column (3th) (i.e., the last column) has been used by the allocate controller 102, the entry number 1 is related to the free entry, and the entry number 3 is related to the newest entry. Moreover, the entry number 1 is smaller than the entry number 3. Although there is the free entry according to the content of the request sequence table 122, the controlling circuit 110 continuously blocks the request. Consequently, the requestor stops issuing the request temporarily.

Figure 5J:
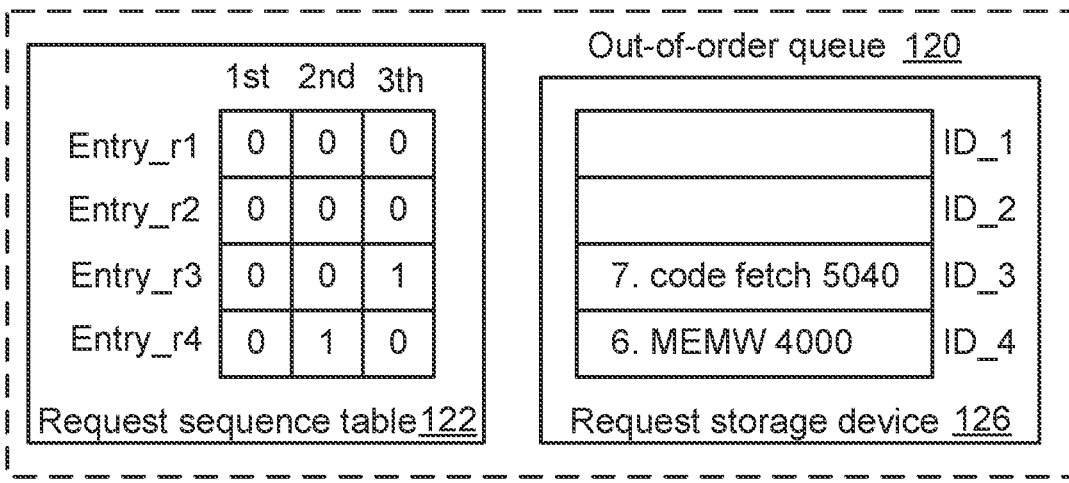

As shown in FIG. 5J, the request in the storage unit ID_2 has been transmitted to the target device by the dispatch controller 106. Consequently, the request is retired by the deallocate controller 104. Meanwhile, the indicating unit in the second entry indicating row Entry_r2 is cleared by the deallocate controller 104. In other words, the logic value of the indicating unit in the first column (1st) of the second entry indicating row Entry_r2 is cleared as "0". According to the request sequence table 122, the storage units ID_3 and ID_4 are the used entries, and the storage units ID_1 and the ID_2 are the free entries, and the storage unit ID_3 is the newest used entry. That is, the entry with the entry number 3 is the newest used entry, and the entry with the entry number 1and the entry with the entry number 2 are the free entries.

As can be seen from the request sequence table 122 in FIG. 5J, the indicating unit in the third column (3th) (i.e., the last column) has been used by the allocate controller 102, the entry number 1 and the entry number 2 are related to the free entries, and the entry number 3 is related to the newest entry. Moreover, the entry number 1 and the entry number 2 are smaller than the entry number 3. Although there is the free entry according to the content of the request sequence table 122, the controlling circuit 110 continuously blocks the request. Consequently, the requestor stops issuing the request temporarily.

Figure 5K:
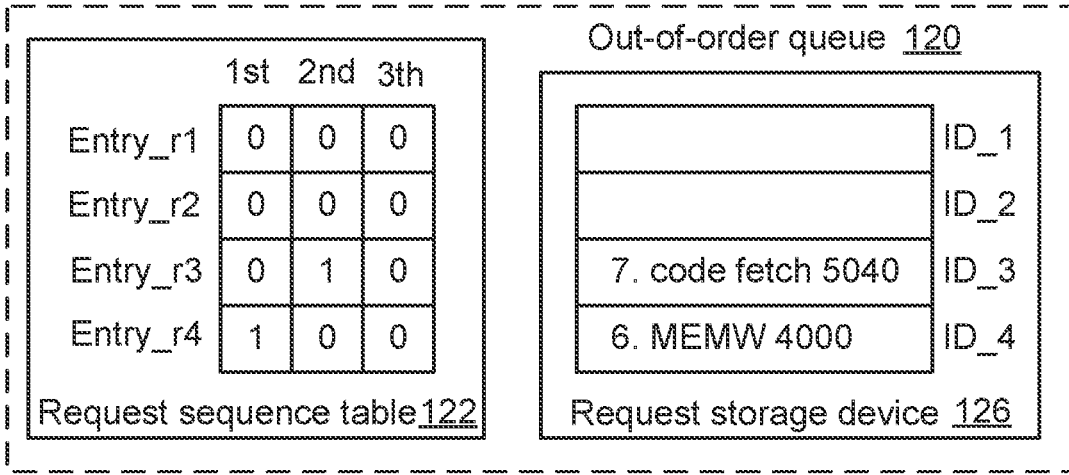

As shown in FIG. 5K, the request of the storage unit ID_2 is retired by the deallocate controller 104. According to the request sequence table 122, the logic values of all indicating units in the first column (1st) are cleared as "0". Then, the contents of the request sequence table 122 are shifted by the deallocate controller 104. As shown in FIG. 5K, all of the contents after the first column (1st) in the request sequence table 122 are forward shifted for one column by the deallocate controller 104, and all indicating units in the last column are cleared. After the contents of the request sequence table 122 are shifted, the indicating units in the second column (2nd) will be used by the allocate controller 102. According to the request sequence table 122, the storage units ID_1 and ID_2 are the free entries, the storage units ID_3 and ID_4 are the newest entries, and the storage unit ID_3 is the newest entry. That is, the entry with the entry number 3 is the newest used entry, and the entries with the entry number 1 and the entry number 2 are the free entries.

As can be seen from the request sequence table 122 in FIG. 5K, the indicating unit in the second column (2nd) (not the last column) is set by the allocate controller 102. Under this circumstance, the controlling circuit 110 stops blocking the request. Consequently, the requestor can issue the request again.

From the above descriptions, the present invention provides the out-of-order buffer 100 and the associated management method. The request sequence table 122 of the out-of-order queue 120 can effectively record that the storage units ID_1~ID_m are the free entries or the used entries. Moreover, the request sequence table 122 can effectively record the storage sequence of the used entries of the storage units ID_1~ID_m.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An out-of-order buffer, comprising:
an out-of-order queue including a request sequence table and a request storage device, wherein said request storage device has m storage units with sequence numbers 1 to m, said request sequence table contains m×n indicating units arranged in m entry indicating rows, where m>1 and n>1, each indicating unit being in an either set or clear state, each entry indicating row of the request sequence table having a maximum of one indicating unit in the set state, and said m×n indicating units corresponding to said m storage units with each storage unit corresponding to n sequence indexes; and
a controlling circuit connected with said out-of-order queue for receiving plural requests and temporarily storing said plural requests into said request storage device by setting associated indicating units and retiring said plural request by clearing said associated indicating units after said plural requests are transmitted to plural corresponding target devices;

wherein after a previous request is stored in a storage unit r' with an associated indicating unit (r', i') being set, said controlling circuit receives a current request, a storage unit r is available for storing said current request with an associated indicating unit (r, i) to be set;

wherein when not all sequence numbers of available storage units are smaller than r', then r is assigned to a value of a smallest number within a range r'<r≤m, and i is assigned a value of i';

wherein when none of indicating units (1, n) to (m, n) are set, and all sequence numbers corresponding to available storage units are smaller than r', r then is assigned to a value of a smallest sequence number of all sequence numbers of available storage units, and i is assigned to a value of i'+1; and wherein when any of indicating units (1, n) to (m, n) are set, and all sequence numbers corresponding to available storage units are smaller than r', then said controlling circuit blocks said current request.

2. The out-of-order buffer as claimed in claim 1, wherein the controlling circuit comprises:

an allocate controller receiving a second request, temporarily storing the second request into the storage unit, and setting one of the n indicating units in the entry indicating row corresponding to the second request;

a dispatch controller for transmitting the second request to at least one of the plural corresponding target devices; and a deallocate controller, wherein when the second request is transmitted to the at least one of the plural corresponding target devices, the deallocate controller retires the second request, and the deallocate controller clears the set indicating unit in the entry indicating row corresponding to the second request.

3. A management method for an out-of-order buffer, the out-of-order buffer comprising an out-of-order queue and a controlling circuit, the out-of-order queue comprising a request sequence table and a request storage device, the controlling circuit comprising an allocate controller, a deallocate controller and a dispatch controller, the request sequence table containing m×n indicating units, the request sequence table containing m entry indicating rows having a corresponding entry number, each of the m entry indicating rows containing n indicating units, each indicating unit being in an either set or clear state and each entry indicating row of the request sequence table having a maximum of one indicating unit in the set state, the controlling circuit performing the management method, comprising steps of:

(a) receiving a request;

(b) judging whether there is any free entry according to a content of the request sequence table, wherein a free entry indicates a storage unit of the request storage device having no request stored within and a corresponding entry indicating row having no set indicating units;

(c) if there is no free entry, blocking the request, and performing the step (b) again;

(d) if there is the free entry, judging whether a used column of the request sequence table is a last column of the request sequence table, wherein a used column indicates an entry indicating unit in the used column having at least one set indicating unit, and the last column is the nth column of the of the request sequence table;

(e) if the used column is the last column of the request sequence table and entry numbers of all free entries are smaller than an entry number of a newest used entry, blocking the request, and performing the step (b) again;

(f) if the used column is the last column of the request sequence table and the entry number of at least one free entry is not smaller than the entry number of the newest used entry, selecting the free entry with an entry number larger than the entry number of the newest used entry to temporarily store the request, and setting the indicating unit in the used column and the entry indicating row corresponding to the free entry;

(g) if the used column is not the last column of the request sequence table and the entry number of at least one free entry is not smaller than the entry number of the newest used entry, selecting the free entry with the entry number larger than the entry number of the newest used entry to temporarily store the request, and setting the indicating unit in the used column and the entry indicating row corresponding to the free entry; and (h) if the used column is not the last column of the request sequence table and the entry numbers of all free entries are smaller than the entry number of the newest used entry, using a next column of the request sequence table as the used column, selecting the free entry with a smallest entry number to temporarily store the request, and setting the indicating unit in the next column and the entry indicating row corresponding to the free entry.

4. The management method as claimed in claim 3, further comprising steps of:

(i) confirming that the request is retired;

(j) the deallocate controller clearing the indicating unit in the entry indicating row corresponding to the request;

(k) if there is any set indicating unit in a specified column corresponding to the cleared indicating unit, performing the step (i) again; and (l) if there is no set indicating unit in the specified column corresponding to the cleared indicating unit, the deallocate controller shifting the indicating units of the request sequence table.

5. The management method as claimed in claim 4, wherein the step (l) of shifting the request sequence table comprises steps of:

(l1) forward shifting each column which is after the specified column.

6. The management method as claimed in claim 5, wherein the step (l) of shifting the request sequence table further comprises steps of:

(l2) clearing all indicating units in the last column.

7. The out-of-order buffer as claimed in claim 1, wherein in response to the request sequence table having at least one set indicating unit, all indicating units in a column of the request sequence table (1, 1) to (m, 1) being clear, forward shifting each column of the request sequence table one column, and clearing all indicating units in the last column.

8. The out-of-order buffer as claimed in claim 1, wherein when the current request is a first request, the associated indicating unit (r, 1) is to be set.

* * * * *